US012263464B2

(12) United States Patent
Pahwa et al.

(10) Patent No.: US 12,263,464 B2
(45) Date of Patent: Apr. 1, 2025

(54) METHOD FOR IN-SITU SYNTHESIS OF METAL ORGANIC FRAMEWORKS (MOFs), COVALENT ORGANIC FRAMEWORKS (COFs) AND ZEOLITE IMIDAZOLATE FRAMEWORKS (ZIFs), AND APPLICATIONS THEREOF

(71) Applicant: DESICCANT ROTORS INTERNATIONAL PRIVATE LIMITED, Delhi (IN)

(72) Inventors: Deepak Pahwa, Delhi (IN); Varun Pahwa, Delhi (IN); Anil Kumar Choudhary, Gurgaon (IN); Sonia, New Delhi (IN); Vivek Kumar Jha, Gurgaon (IN); Anjali Chauhan, Gurgaon (IN); Annu Yadav, Gurgaon (IN)

(73) Assignee: DESICCANT ROTORS INTERNATIONAL PRIVATE LIMITED, Delhi (IN)

( * ) Notice: Subject to any disclaimer, the term of this patent is extended or adjusted under 35 U.S.C. 154(b) by 891 days.

(21) Appl. No.: 16/980,660

(22) PCT Filed: Mar. 7, 2019

(86) PCT No.: PCT/IB2019/051833
§ 371 (c)(1),
(2) Date: Sep. 14, 2020

(87) PCT Pub. No.: WO2019/175717
PCT Pub. Date: Sep. 19, 2019

(65) Prior Publication Data
US 2021/0016245 A1 Jan. 21, 2021

(30) Foreign Application Priority Data
Mar. 14, 2018 (IN) .............................. 201811009443

(51) Int. Cl.
*B01J 20/22* (2006.01)
*B01J 20/28* (2006.01)
*B01J 20/32* (2006.01)

(52) U.S. Cl.
CPC ....... *B01J 20/226* (2013.01); *B01J 20/28045* (2013.01); *B01J 20/3204* (2013.01); *B01J 20/3206* (2013.01); *B01J 20/3236* (2013.01); *B01J 20/3265* (2013.01); *B01J 20/3289* (2013.01)

(58) Field of Classification Search
CPC .... B01J 20/22; B01J 20/226; B01J 20/28045; B01J 20/3204; B01J 20/3206; B01J 20/2336; B01J 20/3265; B01J 20/3289
USPC ....................................................... 502/401
See application file for complete search history.

(56) References Cited

U.S. PATENT DOCUMENTS

| | | |
|---|---|---|
| 4,911,775 A | 3/1990 | Kuma et al. |
| 5,254,195 A | 10/1993 | Tseng et al. |
| 5,505,769 A | 4/1996 | Dinnage et al. |
| 6,265,030 B1 | 7/2001 | Aronson |
| 6,344,073 B1 | 2/2002 | Kurosawa et al. |
| 7,582,798 B2 | 9/2009 | Yaghi et al. |
| 8,466,825 B2 | 6/2013 | Hirose et al. |
| 8,697,191 B2 | 4/2014 | Gaab |
| 8,796,462 B2 | 8/2014 | Li et al. |
| 9,327,268 B2 | 5/2016 | Pahwa et al. |
| 9,376,453 B2 | 6/2016 | Shieh et al. |
| 9,763,452 B2 | 9/2017 | Morris et al. |
| 9,782,745 B2 | 10/2017 | Shimizu et al. |
| 9,815,222 B2 | 11/2017 | James et al. |
| 9,884,309 B2 | 2/2018 | Garcia et al. |
| 2010/0181212 A1 | 7/2010 | Koch et al. |
| 2012/0201730 A1 | 8/2012 | Pahwa et al. |
| 2013/0157837 A1 | 6/2013 | Banerjee et al. |
| 2013/0274087 A1 | 10/2013 | Da Silva et al. |
| 2013/0313193 A1 | 11/2013 | Nair et al. |

FOREIGN PATENT DOCUMENTS

| | | |
|---|---|---|
| CN | 106 000 351 | 10/2016 |
| WO | WO 2016/055228 | 4/2016 |

OTHER PUBLICATIONS

Kong Deying et al: "In situ synthesis of the imine-based covalent organic framework LZU1 on the inner walls of capillaries for electrochromatographic separation of nonsteroidal drugs and amino acids", Mikrochimica Acta, Springer Verlag, Vienna, AT, vol. 184, No. 4, Feb. 8, 2017 (Feb. 8, 2017), pp. 1169-1176, XP036179512, ISSN: 0026-3672, DOI: 10.1007/S00604-017-2095-5 [retrieved on Feb. 8, 2017] p. 1171, right-hand column, lines 5-30 abstract.
"Ohi et al., ""Supramolecular and Coordination Polymer Complexes-Supported by a Tripodal Tripyridine Ligand Containing a1,3,5-Triethylbenzene Spacer""", Inorg. Chem.Jun. 2004, 43, 15, 4561-4563".
"Du et al., ""Metal-Controlled Assembly of Coordination Polymers withthe Flexible Building Block 4-Pyridylacetic Acid (Hpya)""", Crystal Growth & Design2006, 6, 1, 335-3412005, Publication Date Sep. 21, 2005".
"Halper et al., ""Topological Control in Heterometallic Metal-OrganicFrameworks by Anion Templating and Metalloligand Design""" J. Am. Chem. Soc. Nov. 8, 2006, 128, 47, 15255-15268".

(Continued)

Primary Examiner — Edward M Johnson
(74) Attorney, Agent, or Firm — Leason Ellis LLP

(57) ABSTRACT

The present invention relates to a method for the in situ synthesis of of MOFs (metal organic frameworks), COFs (covalent organic frameworks), and ZIFs (Zeolitic imidazolate framework), onto and within different types of porous substrates, and their applications. The present invention provides a unique and easy to utilize method by which a number of MOFs, COFs and ZIFs can be synthesized directly onto and within a porous substrate with high performance efficiency ensuring higher grammage in formation of adsorbent product onto and within the substrate.

43 Claims, 15 Drawing Sheets

(56) References Cited

OTHER PUBLICATIONS

Yoo et al., "Isoreticular Metal-Organic Frameworks and TheirMembranes with Enhanced Crack Resistance and MoistureStability by Surfactant-Assisted Drying", Feb. 2011, Langmuir, 27, 6, 2652-2657.

Wang & Ying, "Sol-Gel Synthesis and Hydrothermal Processing ofAnatase and Rutile Titania Nanocrystals", Chem. Mater. Oct. 1999, 11, 11, 3113-3120.

Bux et al., "Zeolitic Imidazolate Framework Membrane withMolecular Sieving Properties by Microwave- AssistedSolvothermal Synthesis", J. Am. Chem. Soc., Oct. 20, 2009, 131, 44, 16000-16001.

Klinowski et al., "Microwave-Assisted Synthesis of Metal-Organic Frameworks", Dalton Trans., 2011, 40, 321-330.

Hidelang et al., "Tandem post-synthetic modification for functionalized metal-organic frameworks via epoxidationand subsequent epoxide ring-opening", Issue 23, Mar. 2012.

Martinez Joaristi et al., "Electrochemical Synthesis of Some Archetypical Zn2+, Cu2+, and Al3+ Metal Organic Frameworks", Cryst. Growth Des. Jan. 2012, 12, 3489-3498.

Beldon et al., "Rapid Room-Temperature Synthesis of Zeolitic Imidazolate Frameworks by Using Mechanochemistry" Nov. 12, 2010.

"Friscic et al., ""Real-time and in situ monitoring ofmechanochemical milling reactions"", Nature Chemistry, vol. 5, Jan. 2013".

"Arul Dhas et al., ""Preparation of Luminescent Silicon-Nanoparticles: A Novel SonochemicalApproach""", Chem. Mater. Sep. 24, 1998, 10, 3278-3281".

Aslani & Morsali, "Sonochemical synthesis of nano-sized metal-organiclead(II) polymer: A precursor for the preparation of nanostructured lead(II) iodide and lead(II) oxide" vol. 362, Issue 14; Nov. 10, 2009, pp. 5012-5016.

"Jung et al., ""Facile synthesis of MOF-177 by a sonochemical method using1-methyl-2-pyrrolidinone as a solvent""", Dalton Trans., 2010, 39, 2883-2887".

Kim et al., "Control of catenation in CuTATB-n metal-organic frameworks by sonochemical synthesis and its effect on CO adsorption", Jan. 2011.

METHOD FOR IN-SITU SYNTHESIS OF METAL ORGANIC FRAMEWORKS (MOFs), COVALENT ORGANIC FRAMEWORKS (COFs) AND ZEOLITE IMIDAZOLATE FRAMEWORKS (ZIFs), AND APPLICATIONS THEREOF

FIELD OF THE INVENTION

The present invention relates to method for the in-situ synthesis of the class of compounds known as MOFs (metal organic frameworks), COFs (covalent organic frameworks), and ZIFs (Zeolitic imidazolate frameworks), within and onto different types of substrates, and to the applications of such substrates having in-situ synthesized MOFs, COFs and ZIFs. The present invention also relates to an adsorbent matrix/substrate provided with in situ synthesized, or impregnated, MOFs, COFs and ZIFs and the applications of such adsorbent matrix/substrate.

Over the last century, zeolitic materials, silica gels and/or insoluble metal silicates, and activated alumina, activated carbons, mainly inorganic materials, have remained the constant choice of materials in adsorption applications such as in gas masks, moisture removal and humidity control, softening of water using ion exchange method, chromatography, adsorption chillers, and catalysis and the like, due to their versatility.

Zeolites are known to be synthesized for such applications by mixing aqueous solutions of alumina or an aluminate and silica in a basic medium at high temperatures. The aluminosilicate gels so formed undergo hydrothermal crystallization at specific time, temperature and pressure. Insoluble metal silicates are usually prepared by mixing water glass with aqueous solutions of divalent or trivalent metal salts at a particular temperature and time, followed by washing of the unreacted/excess starting materials or by-products formed during the reaction. Silica gels are typically prepared by mixing water glass with an acid, which leads to formation of a gel, followed by drying, washing and again drying. It is also known in the art to prepare metal silicates and silica gels, in-situ, on a substrate shaped as a honeycomb. While these have remained the mainstay of materials used in dehumidification and other adsorption-based applications, search has been on to develop alternative materials which can replace and/or complement them. In recent couple of decades, more specifically in the last decade, a new set of classes of adsorbent materials having organic linkers/ligands as an important substructure, are being researched extensively, which are referred to as MOFs, COFs and ZIFs. Some of these materials show promise in dehumidification, and other adsorption applications for CO2, VOC, and other gases, due to properties such as large surface area, potentially high adsorbate uptake, and/or low temperature of regeneration.

Materials such as metal organic frameworks, covalent organic frameworks and zeolitic imidazolate frameworks are an emerging class of materials with a wide range of industrial applications, for example in gas separation membranes, energy storage devices, biodegradable filters, catalytic filters, gas storage devices, moisture adsorption, carbon recovery, carbon capture, gas capture, bio-alcohol recovery, drug delivery, etc. These materials have shown some promise in such applications due to their unique structures and chemical characteristics, and are further capable of being relatively easily tailored or customized for specific applications.

Prior art and patents related to MOFs, COFs and ZIFs are discussed below. Briefly, these are all in the category of well-known wet and dry chemical synthesis methods. Such methods of material preparation require the use of complex machinery and processes. Further after the materials are prepared, it becomes necessary to utilize binders etc., in coating, granulating, etc., inhibiting the full performance in certain applications as well as inhibiting the shapes in which it can be utilized. For example, the use of binders may inhibit the actual performance/capability of the material in a specific application.

The novel method of this invention is based on in situ synthesis which opens up the potential of use in existing and new applications requiring, as well as new materials providing, high surface exchange area exposure, and also eliminates/minimizes the reliance on binders to bond the material to the substrate. Further, the substrates in certain shapes conventionally require the use of adhesives to join multiple layers of the substrate. In one embodiment, the method of the invention in certain cases provides in situ synthesized material which itself performs this function.

BACKGROUND TO THE INVENTION

Metal organic frameworks are nanoporous, crystalline and synthetic materials consisting of metal ions/clusters coordinated to organic molecules to form one-, two-, or three-dimensional structures having large surface area. The choice of metal and linker has significant effects on the structure and properties of the MOF. The possible manipulations in synthesis, structure, availability of coordination sites on metals, high porosity, high surface area, and good flexibility of the structures are of great interest. MOFs are exciting developments in nanotechnology which have emerged in the past decade. They exhibit unique properties, and potentially expand the market of nanoporous materials. They have potential in high value applications, like natural gas storage, processing, carbon capture, catalysis, etc. They have high potential for water adsorption for cooling applications as compared to conventional desiccants. MOFs can replace silica gel type adsorbents used in adsorption cooling systems which suffer from size, performance and cost limitations.

Certain MOFs show significant natural gas storage capacities, even at low pressures. A key market barrier to natural gas storage is the current necessity for storage and refueling at very high pressures. MOFs have the potential to become an important technology in storage and processing of natural gas. Such MOFs can be engineered/modified to be selective in the gases that they capture. Many MOFs offer significant opportunities for applications across biology and medicine.

MOFs are typically prepared by mixing the organic ligands/linkers and the metal/metal salt with or without a solvent, and then subjecting this mixture to specific conditions of temperature and time and if required pressure and/or stirring to obtain the MOF, and if desired followed by filtration, washing and drying.

MOFs known in the art include MOF-5, Cu-BTC, MIL-53, MIL-68, MIL-100(Fe), Mg-MOF-74, MIL-101(Cr), MOF 801, MOF 177, CAU-10H, MOF 808, IR-MOF-8, CPO-Ni(27), aluminium fumarate, MOF 199, DMOF (Zn), DUT-4, and the like.

The bidentate, tridentate organic compound can be derived from a dicarboxylic acid, such as oxalic acid, tartaric acid, succinic acid, 1,4-butanedicarboxylic acid, 1,4-butenedicarboxylic acid, 4-oxopyran-2,6-dicarboxylic acid, decanedicarboxylic acid, 1,8-heptadecanedicarboxylic acid, 1,6-hexanedicarboxylic acid, heptadecanedicarboxylic acid, acetylene dicarboxylic acid, 1,9-heptadecanedicarboxylic acid, 1,2-benzenedicarboxylic acid, 1,3-benzenedicarboxylic acid, 2,3-pyridinedicarboxylic acid, pyridine-2,3-dicarboxylic acid, 1,4-benzenedicarboxylic acid, p-benzenedicarboxylic acid, imidazole-2,4-dicarboxylic acid, 2-methylquinoline-3,4-dicarboxylic acid, quinoline-2,4-dicarboxylic acid, quinoxaline-2,3-dicarboxylic acid, 6-chloroquinoxaline-2,3-dicarboxylic acid, 1,3-butadiene-1,4-dicarboxylic acid, 4,4'-diaminophenylmethane-3,3'-dicarboxylic acid, quinoline-3,4-dicarboxylic acid, di imidedicarboxylic acid, pyridine-2,6-dicarboxylic acid, 2-methylimidazole-4,5-dicarboxylic acid, 7-chloro-4-hydroxyquinoline-2,8-dicarboxylic acid, thiophene-3,4-dicarboxylic acid, tetrahydropyran-4,4-dicarboxylic acid, perylene-3,9-dicarboxylic acid, 2-isopropylimidazole-4,5-dicarboxylic acid, perylenedicarboxylic acid, Pluriol E 200-dicarboxylic acid, 3,5-cyclohexadiene-1,2-dicarboxylic acid, octanedicarboxylic acid, pentane-3,3-carboxylic acid, 3,6-dioxaoctanedicarboxylic acid, 4,4'-diamino-1,1'-biphenyl-3,3'-dicarboxylic acid, 4,4'-diaminobiphenyl-3,3'-dicarboxylic acid, benzidine-3,3'-dicarboxylic acid, 1,1'-binaphthyldicarboxylic acid, 1,4-bis(phenylamino)benzene-2,5-dicarboxylic acid, 7-chloro-8-methylquinoline-2,3-dicarboxylic acid, 1-anilinoanthraquinone-2,4'-dicarboxylic acid, 1,4-bis(carboxymethyl)piperazine-2,3-dicarboxylic acid, phenylinanedicarboxylic acid, 7-choroquinoline-3,8-dicarboxylic acid, polytetrahydrofuran 250-dicarboxylic acid, 1-(4-carboxy)phenyl-3-(4-chloro)phenylpyrazoline-4,5-dicarboxylic acid, 1,4,5,6,7,7-hexachloro-5-norbornene-2,3-dicarboxylic acid, 1,3-dibenzyl-2-oxoimidazolidine-4,5-dicarboxylic acid, 1,4-cyclohexanedicarboxylic acid, naphthalene-1,8-dicarboxylic acid, 1,3-dibenzyl-2-oxoimidazolidine-4,5-cis-dicarboxylic acid, 2,2'-biquinoline-4,4'-dicarboxylic acid, 2-benzoylbenzene-1,3-dicarboxylic acid, pyridine-3,4dicarboxylic acid, 3,6,9-trioxaundecanedicarboxylic acid, Pluriol E 300 dicarboxylic acid, Pluriol E 400-dicarboxylic acid, hydroxybenzophenonedicarboxylic acid, Pluriol E 600-dicarboxylic acid, pyrazole-3,4-dicarboxylic acid, bis(4-aminophenyl)sulfone diimide-dicarboxylic acid, 5,6-dimethyl-2,3-pyrazinedicarboxylic acid, bis(4-aminophenyl) ether diimide-dicarboxylic acid, 2,3-pyrazinedicarboxylic acid, 4,4'-diaminodiphenylmethane diimide-dicarboxylic acid, 1,4-naphthalenedicarboxylic acid, 1,3-adamantanedicarboxylic acid, 1,8-naphthalenedicarboxylic acid, 2,6-naphthalenedicarboxylic acid, 2,3-naphthalenedicarboxylic acid, 8-methoxy-2,3-naphthalenedicarboxylic acid, 8-sulfo-2,3-naphthalenedicarboxylic acid, anthracene-2,3-dicarboxylic acid, 8-nitro-2,3-naphthalenecarboxylic acid, 2',3'-diphenyl-p-terphenyl-4,4"-dicarboxylic acid, (diphenyl ether)-4,4'-dicarboxylic acid, 4(1H)-oxothiochromene-2,8-dicarboxylic acid, imidazole-4,5-dicarboxylic acid, 5-tert-butyl-1,3-benzenedicarboxylic acid, 7,8-quinolinedicarboxylic acid, 4,5-imidazoledicarboxylic acid, or derived from a tricarboxylic acid such as 1,3,5-benzenetricarboxylic acid, 1,3,5-tris(4-carboxyphenyl)benzene, and the like.

Excess solvent residue, unwanted starting material, and/or unwanted by-products can be removed by methods such as washing of the filtrate one or more times and drying.

The MOFs which are illustrated above have application across a range of industries, such as sustainable drug release or water adsorption at different RH from low to high, heterogeneous catalysis, natural gas storage, dispersive solid phase extraction, fluoride ion removal, controlled release application and product separation applications and, adsorbent for heat exchange applications, various adsorption applications such as for hydrogen sulphide gas, methane gas, and for heat pump applications.

Zeolitic imidazolate frameworks (ZIFs) are a group of metal-organic frameworks which are topologically isomorphic with zeolites. ZIFs comprise of tetrahedrally-coordinated transition metal ions (e.g. Fe, Co, Cu, Zn) connected by imidazolate linkers. Here, the metal-imidazole-metal angle is 145°. Also, in case of zeolites the Si—O—Si angle is 145°, ZIFs have zeolite-like topologies. They are a subset of the MOF hybrids as they combine organic and metal frameworks. As a result, hybrid microporous and crystalline structures are created. Properties of MOFs/ZIFs largely depend on the properties of the metal clusters, ligands/linkers, and the conditions maintained during their formation. ZIFs have significant properties to be applied to carbon capture process, methane capture, nitrogen-methane separation, hydrogen production, etc. as examples. To alter the carbon dioxide adsorption capacity of ZIFs, functional groups with different polarities/symmetries can be employed to the imidazolate ligands without changing the transitional-metal cations. ZIFs are generally more stable thermally and chemically than MOFs, and are therefore considered suitable for use at a wider range of temperatures and chemical processes. ZIFs exhibit hydrophobic properties and water stability. Zeolites and MOFs adsorb water along with $CO_2$. Water vapour is generally present in carbon-rich exhaust gases, MOFs adsorb water, lowering the amount of $CO_2$ required to reach saturation. ZIFs exhibit nearly identical performances in dry and humid conditions. They have higher $CO_2$ selectivity over water that allows ZIFs to store more carbon before saturation is reached. Due to their robust porosity, chemical stability and resistance to thermal changes, ZIFs such as ZIF-1, ZIF-7, ZIF-8, ZIF-35, ZIF-67, ZIF-69, ZIF-71, ZIF-90, ZIF-95 and ZIF-100 are being investigated for various applications such as gas storage, carbon capture, bio-alcohol recovery, gas separation, $CO_2$ and $N_2$ and methane separation etc. Many ZIFs are also being investigated for their use in drug delivery, catalysis, in sensing applications and applications requiring hydrophobicity and/or hydrophilicity.

Covalent organic frameworks (COFs) are two-dimensional or three-dimensional porous, crystalline organic solids made from light elements such as C, B, N, H and O. They are extended structures where the building blocks are linked by strong covalent bonds. They possess rigid structures, low densities and high thermal stabilities up to 600° C. Preparation of COFs comprises building of molecular blocks which can be functionalized into light-weight materials for various applications. Illustrative examples of COFs include COF-202, COF-1, COF-5, PcPBBA, TpPa-1, TpPa-2, TpPa-N02, TpPa-F4, TpBD, TpBD-(N02) etc., all of which have applications in industries such as gas storage, sensing, catalysis, optoelectronics etc. COFs generally exhibit permanent porosity and specific surface areas surpassing those of most zeolites and porous silicates and that is the reason why COFs have potential use in—applications such as carbon capture, hydrogen storage, catalyst, methane storage, gas separation, and dehydration and/or gas/water adsorption applications. These properties make COFs good candidates to replace metal silicates, zeolites and silica gels—in various applications.

There are references for preparation of such MOFs, COFs and ZIFs in the art. Prior art techniques for preparation of MOFs have typically followed one of the following approaches: a wet method, a dry method, a microwave mediated method and a spray method.

The wet method for preparation of MOFs has involved either hydrothermal techniques or solvothermal techniques, and typically involves first forming a solution of an organic ligand in water or any other solvent(s). This is then reacted with a metal salt solution at specific time and temperature. The product so obtained is then washed with water or solvent(s), as desired, to obtain the required metal organic framework (MOF).

The dry method of MOF formation has involved the use of mechano-chemical techniques where the use of water or solvent(s) is substantially avoided. The reaction is carried out substantially in dry state, generally with an extruder. Apparently, this method is limited to MOFs and has limitations in being extended to COFs and ZIFs.

The microwave mediated method usually involves subjecting stock solutions of the precursors of the metal organic framework to microwave irradiation after conversion into a reaction liquid. The MW radiation is used as the reaction igniter and the MOF obtained is drawn out from the reactor. This can also be used to prepare covalent organic frameworks and zeolitic imidazolate frameworks using stock solutions of the respective precursors. However, one apparent limitation of this technology is its energy intensive nature since it is entirely dependent on microwave generation.

The spray method which so far has been known only for manufacture of MOFs generally comprises sequential or simultaneous spraying of precursor solutions onto a surface to be coated such that the MOF is formed on the surface. This method may not be totally suitable for manufacture of COFs or ZIFs.

Examples of Wet Method Preparation of MOFs Include

1. Preparation of MIL-100(Fe). This MOF is prepared by mixing iron powder and an organic ligand such as benzene tricarboxylic acid and adding hydrofluoric acid. Subsequently nitric acid is added followed by addition of water and heating for a specific time and temperature and till the framework is formed. The process can also be done without hydrofluoric acid. In this case ferric nitrate, the benzene tricarboxylic acid and water are mixed under stirring at a specific pressure, temperature, and time, and then solvent extraction is carried out with ethanol, followed by drying.
2. Preparation of MOF-5: MOF-5 is prepared by using solvothermal synthesis. Zinc nitrate hexa-hydrate and 1,4-benzenedicarboxylic acid are dissolved in DMF. The solution is kept in a closed vessel and white crystals are observed after heating the reaction mixture. During filtration, the crystals are washed several times with fresh solvent. The solid, thus formed, is stored under dry DMF.
3. Preparation of Chromium based MOFs such as MIL-101(Cr): These are prepared typically heating a mixture of terephthalic acid, chromium nitrate, hydrofluoric acid, and water, followed by filtration, washing and drying. This procedure can also be done without using hydrofluoric acid.
4. Preparation of Cu-BTC: Cu-BTC synthesis is carried out by mixing 1,3,5 benzene tricarboxylic acid in methanol and N,N-dimethylformamide. Another solution is prepared by mixing copper acetate monohydrate in a mixture of ethanol/distilled water. Both the solutions are separately stirred. Solution containing 1,3,5 benzene tricarboxylic acid is added into another solution and sonicated. The suspension is then thermally treated in an autoclave. The resulting blue product is separated, washed and dried.
5. Preparation of Aluminium fumarate: This MOF is prepared in the prior art by using aluminium metal salt and fumaric acid which provides a bidentate ligand for coordination to the aluminium ion and forming a metal organic framework. In the known art, the precipitation reaction proceeds in a basic aqueous medium. The water adsorption property of aluminium fumarate, with s-shaped isotherm and narrow hysteresis in a typical moisture adsorption application, provides a great advancement in the MOF based sorption heat processes.
6. Preparation of MOF-801 P—This is prepared by dissolving Fumaric acid and zirconium oxychloride in a solvent mixture of DMF/formic acid which is heated. White precipitate obtained is filtered, washed and dried.
7. Preparation of CAU-10H: This is prepared by mixing 1,3 benzene dicarboxylic acid, aluminium sulphate, dimethylformamide, and water, followed by heating for a specific time, cooling and then filtration, followed by washing and then drying.
8. Preparation of CPO-Ni-27: This MOF is typically prepared by dissolving 2,5-dihydroxyterephthalic acid in tetrahydrofuran. Nickel (II) salt such as nickel (II) acetate tetrahydrate is dissolved in water and the two solutions are then mixed, heated, filtered, washed and dried. Alternatively, a mixture of 2,5-dihydroxyterephthalic acid, tetrahydrofuran, water and nickel acetate as above can be mixed together and the solution subjected to heating, filtration, washing and drying.

Covalent organic frameworks are typically prepared by solvothermal, sonochemical, ionochemical, microwave mediated, mechanochemical, surface-direct synthesis techniques.

ZIFs are typically prepared in the art by solvothermal or hydrothermal synthesis, where a hydrated metal salt, an imidazole with acidic proton, a solvent and a base, if required are heated to result in the formation of the zeolite-imidazolate frameworks.

Generally, all the prior art methods, except the spray method, result in the formation of powders, which are then mixed with binders prior to use, or where the substrate to which the framework has to be applied is coated with the binder, and the finished MOF, COF, or ZIF powder deposited thereon according to known techniques. U.S. Pat. No. 8,466,825 discloses a process for the preparation of multi-dimensional microporous metal organic compounds by grinding a metal in ionic form with a bridging organic ligand to obtain a MOF. This procedure can be done with or without a solvent according to this disclosure.

U.S. Pat. No. 9,815,222 which is by the same group as U.S. Pat. No. 8,466,825, discloses a further development wherein a continuous production method is disclosed ostensibly to obtain higher yields, by simply mixing the metal in ionic form with a bridging organic ligand under conditions of shear and pressure to form covalent bonds.

U.S. Pat. No. 9,763,452 discloses a method for preparation of MOFs involving low temperature and the use of solvents. The method of this disclosure essentially focuses on combining dihydroxyterephthalic acid in aqueous basic solution of the metal salt.

U.S. Pat. No. 9,782,745 discloses a wet method for preparation of MOFs for carbon dioxide adsorption wherein the metal ion and organic ligand are reacted at a desired temperature in solvents such as water and alcohol.

U.S. Pat. No. 8,697,191 discloses a process essentially for forming a coating or a layer of a porous metal organic framework (MOF) on a surface of a support and is limited to spraying a solution containing a metal ion and a solution of organic ligand, sequentially or simultaneously, to form a layer on the surface. One inherent limitation of this process is that it can be used only for spraying only on an exterior surface of the substrate in case the substrate is formed into a specific shape such as a tube, a cylinder or a honeycomb structure. The process of this patent generally involves the use of a spray drum where the substrate is placed for spraying to make a layer of the MOF coating. The process of this patent when practiced provides a coating layer with a grammage of less than 5 GSM, though the document itself claims a grammage of up to 100 GSM. The surfaces include natural and/or synthetic fibers, and the method is limited by being inapplicable to uses where high temperatures above 100° C. are possible for example for activation. There is also no disclosure of the possibility of use of this method for inert fibers such as glass fibers, ceramic fibers and the like as the substrate.

U.S. Pat. No. 8,697,191 discloses the use of only the following substrate materials—metallic materials and non-metallic materials. Metallic substrates limit the level of deposition of the active material. The non-metallic material identified in the patent is limited to natural fibers and organic fibers. This choice of the substrate material has a direct impact on temperatures of both manufacture as well as use. There is no teaching that the process can be implemented independent of the nature of the substrate. For example, a serious limitation of the nature of the substrate is its reactivity/dependence of temperatures at manufacture and in use. Non-metallic substrates such as those identified in this patent viz. natural fibers and organic materials, carry a serious temperature limitation at point of use. Such materials by their very nature cannot be used in applications where the temperatures can rise above the degradation point of the base substrate. U.S. Pat. No. 9,884,309 describes synthesized MOF crystallites of ZIF-8 structures, UiO-66, MIL-101, ZIF-90; involving a binder and optionally, one or more additives in not more than 10% by mass. US Publication 2013274087 A1 describes development of covalently bonded MOFs on surface treated substrates for gases/toxic chemical adsorption.

Prior Art Relating to Preparation of COFs and ZIFs

U.S. Pat. No. 7,582,798 discloses a covalently linked organic framework comprising boron clusters linked together by plurality of linking groups. U.S. Pat. No. 8,796,462 discloses a zeolite imidazolate framework. Methods of preparation that are disclosed therein involve organic solvents such as anhydrous tetrahydrofuran and hexanes. U.S. Pat. No. 9,376,453 discloses the preparation of zeolite imidazolate frameworks in a water-based system at room temperature, where in particular, the uniformity is obtained by use of an adjuvant or additive if desired.

WO2016/055228 discloses a microwave mediated method for the manufacture of MOFs or COFs. This method involves the formation of a reaction solution of the precursors, mixing them prior to subjecting the reaction solution to a microwave radiation in continuous flow state. The MOF or COF so formed is drawn out, and then washed and dried if required. This method involves the express use of a mixing means prior to microwave irradiation. MW radiation acts as a reaction igniter, and the method is therefore very energy intensive.

MOF synthesis by slow evaporation process, involving mixture of solvents, increasing the solubility of reagents, resulting fast evaporation of low-boiling solvents is an option towards energy intensive room temperature synthesis (Ohi et al., 2004; Du et al., 2005; Halper et al., 2006; Yoo et al. 2011). Solvothermal synthesis generally involve high boiling point solvents, commonly using organic solvents as dimethyl formamide, diethyl formamide, ethanol, methanol, acetone, acetonitrile etc, aiming nanoscale morphologies require high temperature resistant vessels/autoclaves and long reaction duration (Wang & Ying, 1999). Rapid growth of nanosized crystals can be obtained by adopting microwave assisted solvothermal synthesis (Bux et al., 2009; Klinowski et al., 2011, Hidelang et al., 2012). Industries prefer synthesis of MOFs through Electrochemical process comprising metal electrodes as source of ionic metal and its dissolution into mixture of organic linkers and electrolytes (Martinez Joaristi et al., 2012). Solvent free synthesis leads to formation of MOFs (Beldon et al., 2010) and ZIFs (Friscic et al., 2013) through mechanochemical process where a small amount of liquid may be added in liquid assisted grinding (LAG) process. The extreme conditions generated through sonochemical synthesis leads to homogeneous nucleation centres and reduced crystallization times compared to solvothermal synthesis (Arul Dhas et al., Aslani & Morsali, 2009, Jung et al., 2010, Kim et al., 2011).

The above referred disclosures also state various industrial applications of MOFs COFs and ZIFs such as in separating propane from propene, use in preparation of catalytic filters, sensing applications, gas separation applications. In all the above applications, the pre-prepared/synthesized MOF/COF/ZIF is generally coated or deposited onto the relevant substrate.

Prior art relating to dehumidifying applications generally disclose the use of metal silicates, silica gels, etc.

U.S. Pat. No. 4,911,775 describes forming a honeycomb matrix which is impregnated with water glass before or after the lamination process. The matrix is then soaked in an aqueous solution of aluminium sulphate or magnesium sulphate to form silicate hydrogel. Washing and drying of the matrix is carried out to obtain dehumidifying element. Here, metal silicate is deposited in the apertures between the fibers of inorganic substrate.

U.S. Pat. No. 6,344,073 describes the process of obtaining a dehumidifying material comprising silica gel and a metal oxide which is prepared by adhering alkali silicate/alkoxysilane to inorganic fiber and then immersing the impregnated substrate in solution containing iron salt/iron/other metal salt followed by drying.

U.S. Pat. No. 5,505,769 describes a humidity exchanger element which is formed of a honeycomb matrix with flat and corrugated sheets of inorganic fiber substrate where the adsorbent formed is an aerogel being a silicate of titanium or titanium-aluminium.

U.S. Pat. No. 6,265,030 describes preparing a dehumidifying element by impregnating substrate with waterglass first and then dipping in an aqueous solution of a metal salt and an acid.

U.S. Pat. No. 5,254,195 describes a process for preparing a moisture exchange element by impregnating the substrate with an aqueous solution containing colloidal silica, an acid and a metal salt followed by drying and gelatinization.

U.S. Pat. No. 9,327,268 describes formation of a macroporous desiccant based honeycomb matrix, synthesized in-situ. The process comprises impregnating the substrate with water glass, subsequently treating with aqueous metal salt or acid solution or a combination of both followed by washing and drying.

There is increased interest in the use/application of MOFs, COFs or ZIFs in various industries/applications such as VOCs, CO2 and gas separation, carbon capture, hydrogen storage, catalyst, dehumidification, methane storage, energy storage, biodegradable filters, catalytic filters, gas storage, carbon recovery, drug delivery, bio-alcohol recovery and dehydration and/or gas/water adsorption applications.

As is evident, such applications of MOFs, COFs, and ZIFs necessarily require the use of a binder and a separate step of coating or deposition in actual use, irrespective of the nature of the application—gas exchange, catalysis etc. Such techniques are necessarily expensive, time consuming, and also involve greater effort in ensuring uniformity of deposition for example, as well as maintaining structural integrity of the framework adhering to the substrate. Again, in such prior art applications where multiple laminates/sheets of the substrate are used, it becomes necessary to use an adhesive system to ensure bonding between the sheets, particularly if they are in different shapes such as a single-facer.

The prior art applications of these materials have also required a separate, time consuming and expensive analysis to determine the compatibility of specific binder systems and/or adhesive systems to specific MOFs, COFs or ZIFs, and also difficulties in determining loading percentages and ensuring higher grammage of deposition or coating. The choice of substrates is also limited to materials which are not inert at high temperatures that are generally required for activation of the deposited or coated material. Generally, also the uniformity in amounts of loading and thickness of deposition/coating of the adsorbent material on the substrate cannot be easily controlled. These disadvantages necessarily limit the range of industrial applicability of such materials in areas where there is a high level of temperature sensitivity, and also limits the uniform reproducibility of the method. That is, for every industrial application, a separate deposition/coating protocol has to be devised.

As will be seen, there is a desirability to provide a method for the synthesis of MOFs, COFs and/or ZIFs where the method is easily reproducible across a wide range of industrial applications, irrespective of the nature of the substrate or application, and also wholly or substantially avoiding the use of binders at any stage. Additionally, also such method should be formulated whereby higher efficiency in performance can be ensured by ensuring higher grammage in formation of the adsorbent product, and where the level of sensitivity to temperature of activation or regeneration is minimized.

The applicants herein are pioneers in addressing such problems specific to the HVAC industry use of silica gels, metal silicates and zeolites, singly or in combination, without the use of binders. In fact, applicants herein developed a novel and inventive in situ method for the formation of special metal silicates on a porous substrate which provided flexibility, ease of use, and efficiency in performance far above expected. Such efforts by the applicants herein, and others had so far been limited to inorganic materials/adsorbents.

It is an objective of the present invention to provide a novel method for in situ synthesis of MOFs, COFs and ZIFs, within and onto porous substrates, in quantities as much as 6× of bare substrate weight, which additionally overcomes the problems associated with the prior art.

It is another objective of the invention to provide for the manufacture of substrates/matrices that are shaped in any desired geometry, wherein MOFs, COFs, ZIFs are synthesized in situ, or impregnated, for use in adsorption applications such as dehumidification, or adsorption of CO2, VOC or other gases etc., which result in high energy efficiency, high performance, or both, due to very high surface areas often in excess of 1000 m2/g, low temperature required for regeneration usually lower than 100-C, coupled with high adsorbate uptake up to 2× of adsorbent.

Despite our best efforts, we have not been able to locate any prior art which teaches or guides towards in situ synthesis of an organic substructure containing substance such as a MOF, a COF or a ZIF within and onto a porous substrate, and having one or more of the following attributes: high surface area, porosity, selective adsorption, reactivity.

SUMMARY OF THE INVENTION

The present invention provides a method for the in situ synthesis of MOFs, COFs, or ZIFs, onto and within a porous substrate by contacting the porous substrate with a first solution and a second solution, wherein the first and second solutions are capable of forming the said MOFs, COFs, or ZIFs. The method of the invention provides a flexible and easy-to-utilise method of generating MOFs, COFs and/or ZIFs directly and in situ onto and within a substrate whereby a higher and/or controlled degree of formation is achieved and essentially overcomes or mitigates the problems associated with the prior art.

The method of the invention is independent of the MOF, COF or ZIF and is reproducible across a range of applications.

In another embodiment, the present invention also provides an adsorbent matrix wherein one or more adsorbents selected from the group consisting of MOFs, COFs and ZIFs, or a combination of one or more of MOFs, COFs and ZIFs and an inorganic adsorbent are synthesized in situ or impregnated thereon as well as a method for in situ synthesis or impregnation applicable for the manufacture of such adsorbent matrix.

In yet another embodiment, the invention also provides a desiccant wheel comprising an adsorbent matrix manufactured according to the previous embodiment, and uses of such desiccant wheels.

In yet another embodiment, the present invention also provides a method for filtering an adsorbate from a fluid using an adsorbent laden matrix provided with an adsorbent selected from MOFs, COFs, ZIFs, a combination of one or more of MOFs, COF, ZIFs and an inorganic adsorbent.

BRIEF DESCRIPTION OF THE ACCOMPANYING DRAWINGS

Figure 1A:
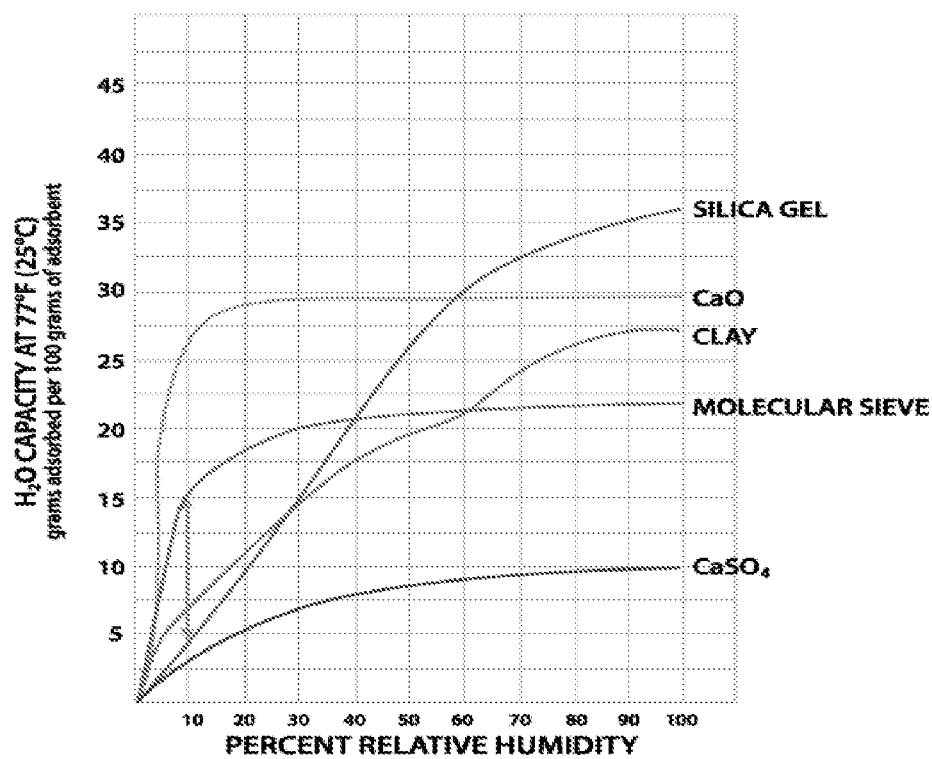
FIG. 1a shows the water uptake capacity of various conventional inorganic adsorbents at different RH (source: Sorbent Systems/PNNL).
Figure 1B:
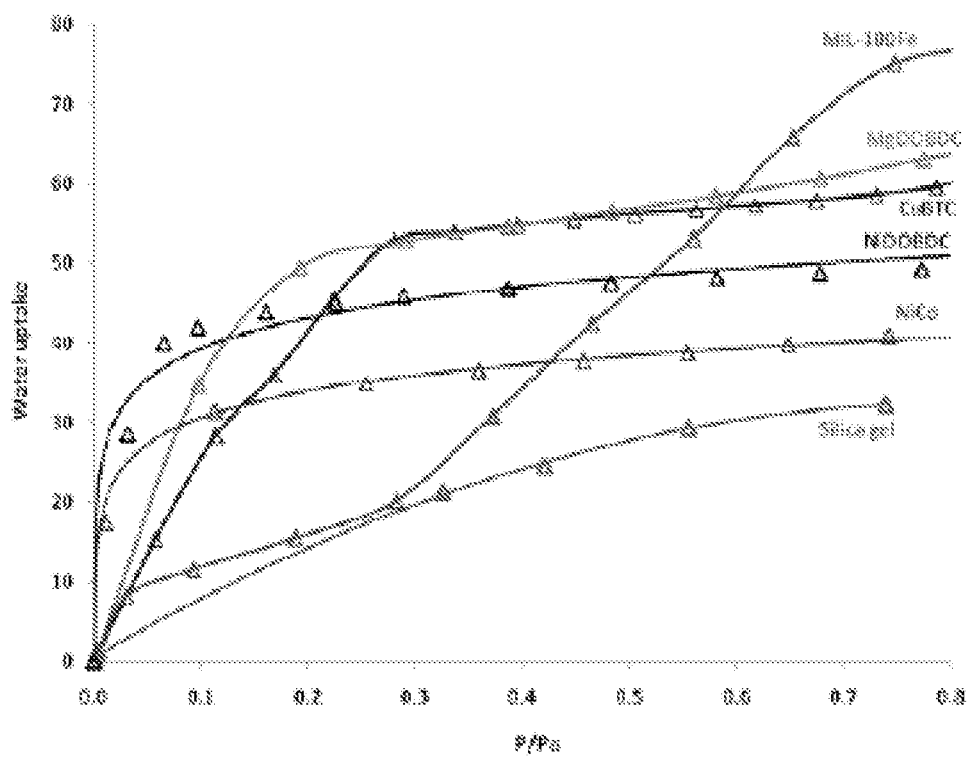
FIG. 1b shows the water uptake capacity of various MOFs compared with silica gel at different RH (Source: PNNL).
Figure 1C:
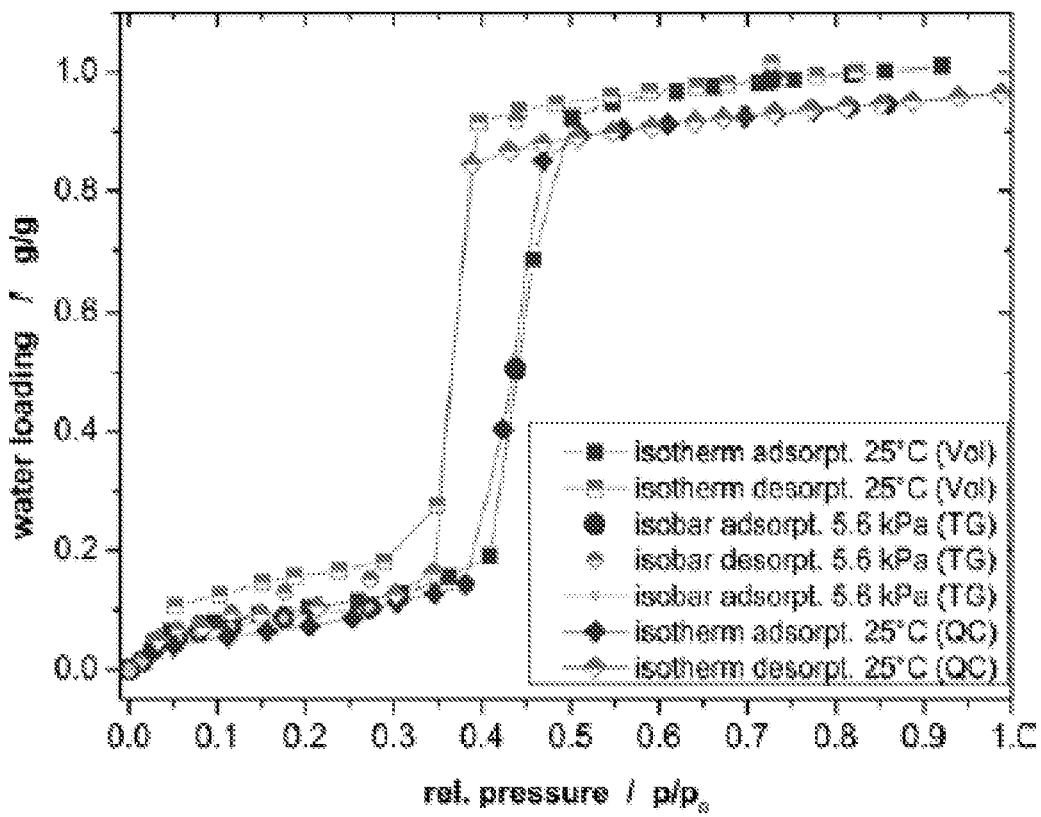

FIG. 1c shows adsorption and desorption curves of a specific S-type MOF (MOF-101) at different RH (Source: Janiak et al, Eur. J. Inorganic Chem., 2011/PNNL).

Figure 2A:
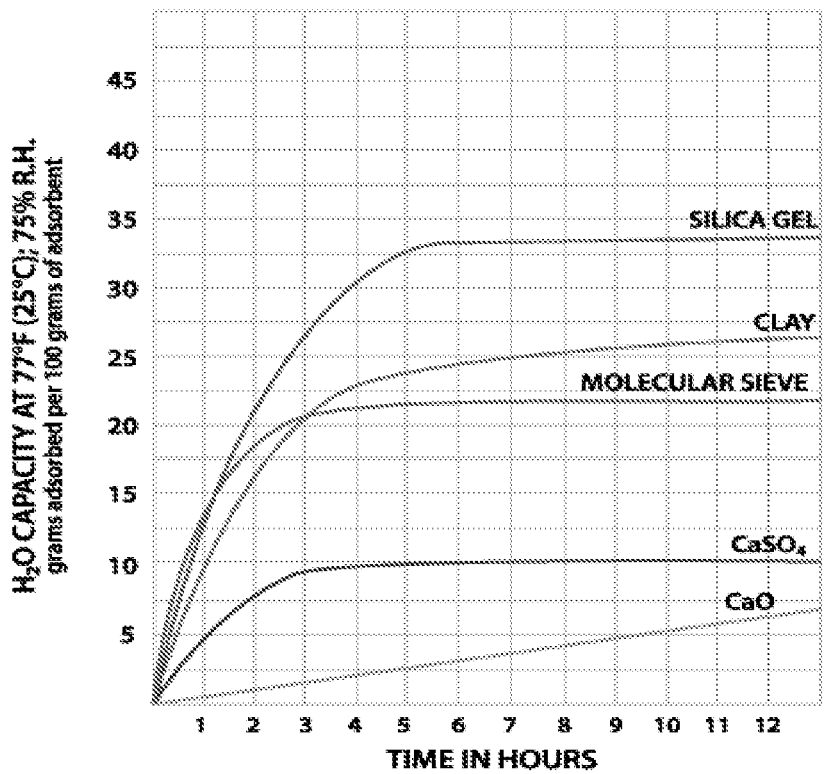
Figure 2B:
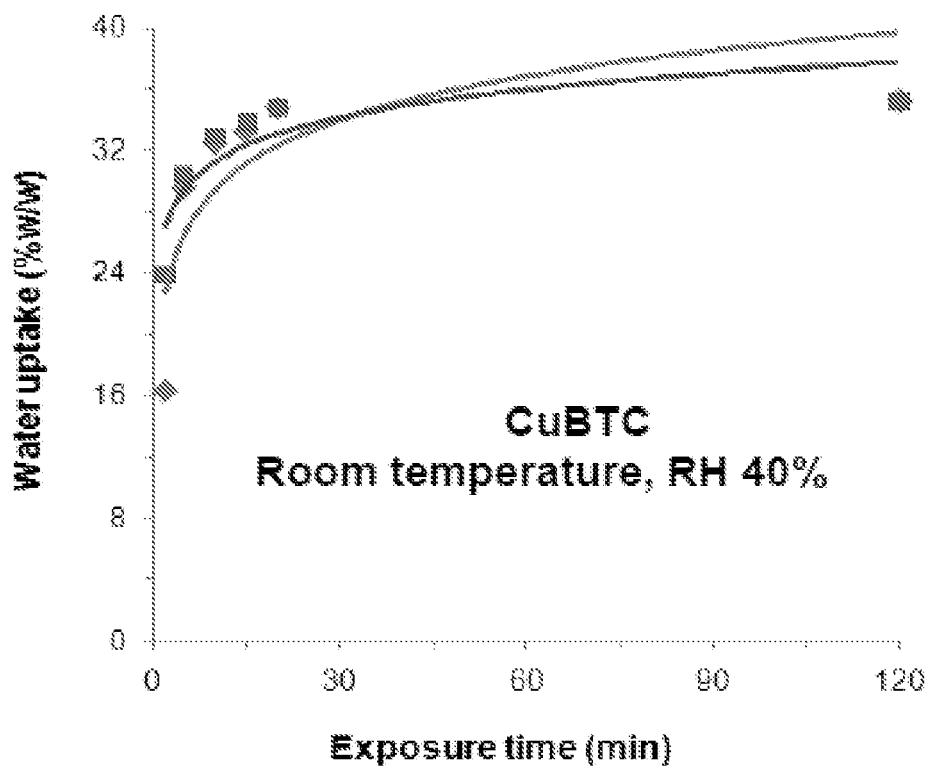

FIG. 2a shows the water uptake capacity of various adsorbents at 75% RH at 25-C at different time intervals (Source: Sorbent Systems/PNNL) FIG. 2b shows water uptake capacity of a MOF (Cu-BTC) at 40% RH at room temperature and at different exposure times (Source: PNNL).

Figure 2C:
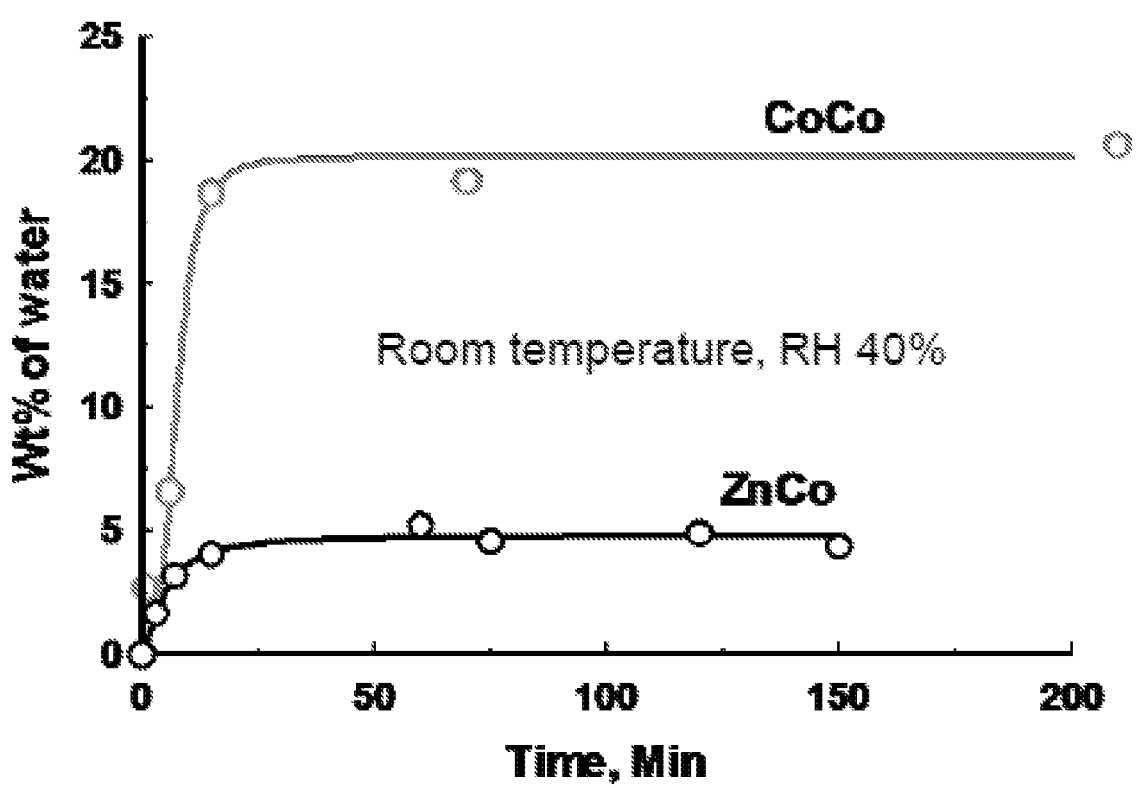

FIG. 2c shows the water uptake capacity of two different adsorbents at 40% RH at room temperature at different exposure times (Source: PNNL).

Figure 3A:
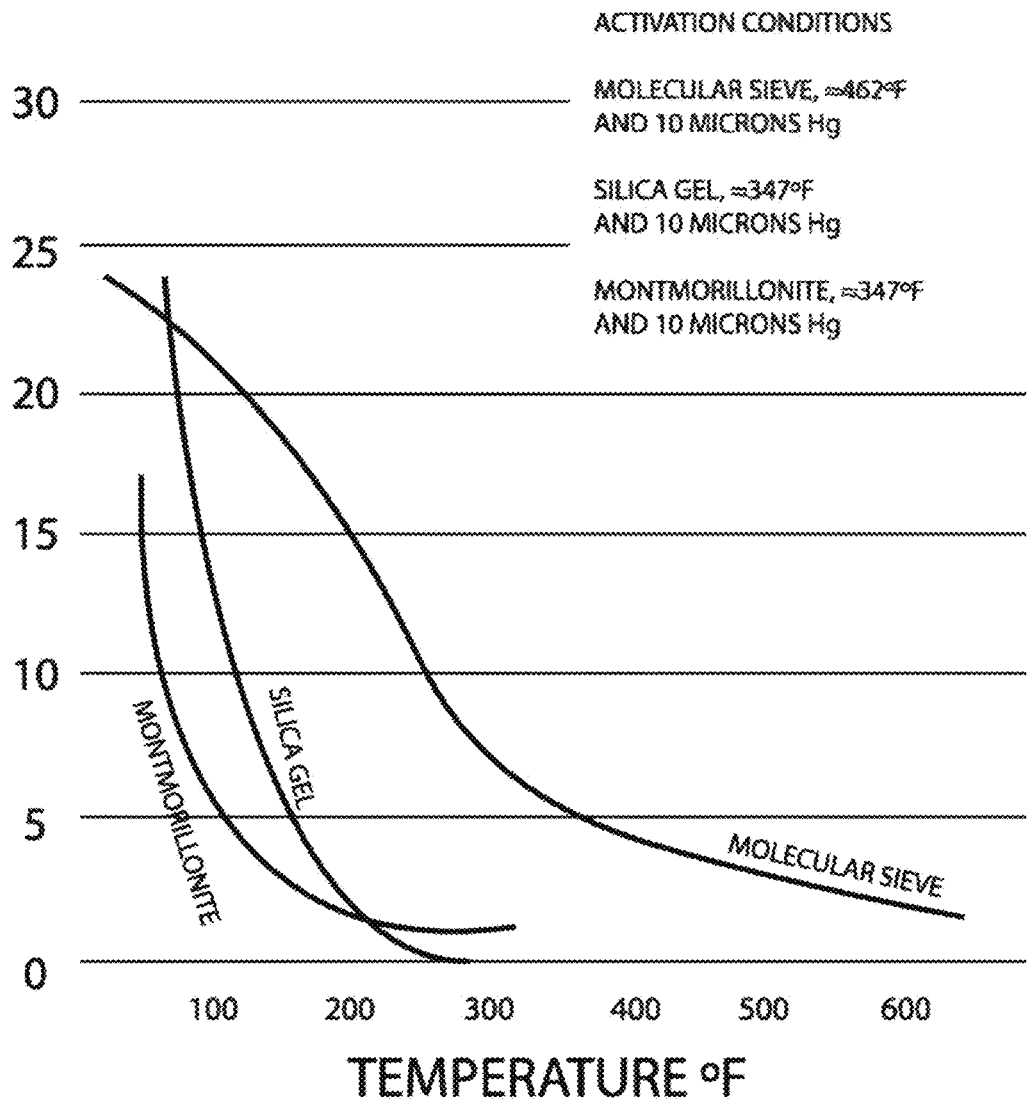

FIG. 3a shows the water uptake capacity of various conventional adsorbents at different activation conditions (Source: Sorbent Systems/PNNL).

Figure 3B:
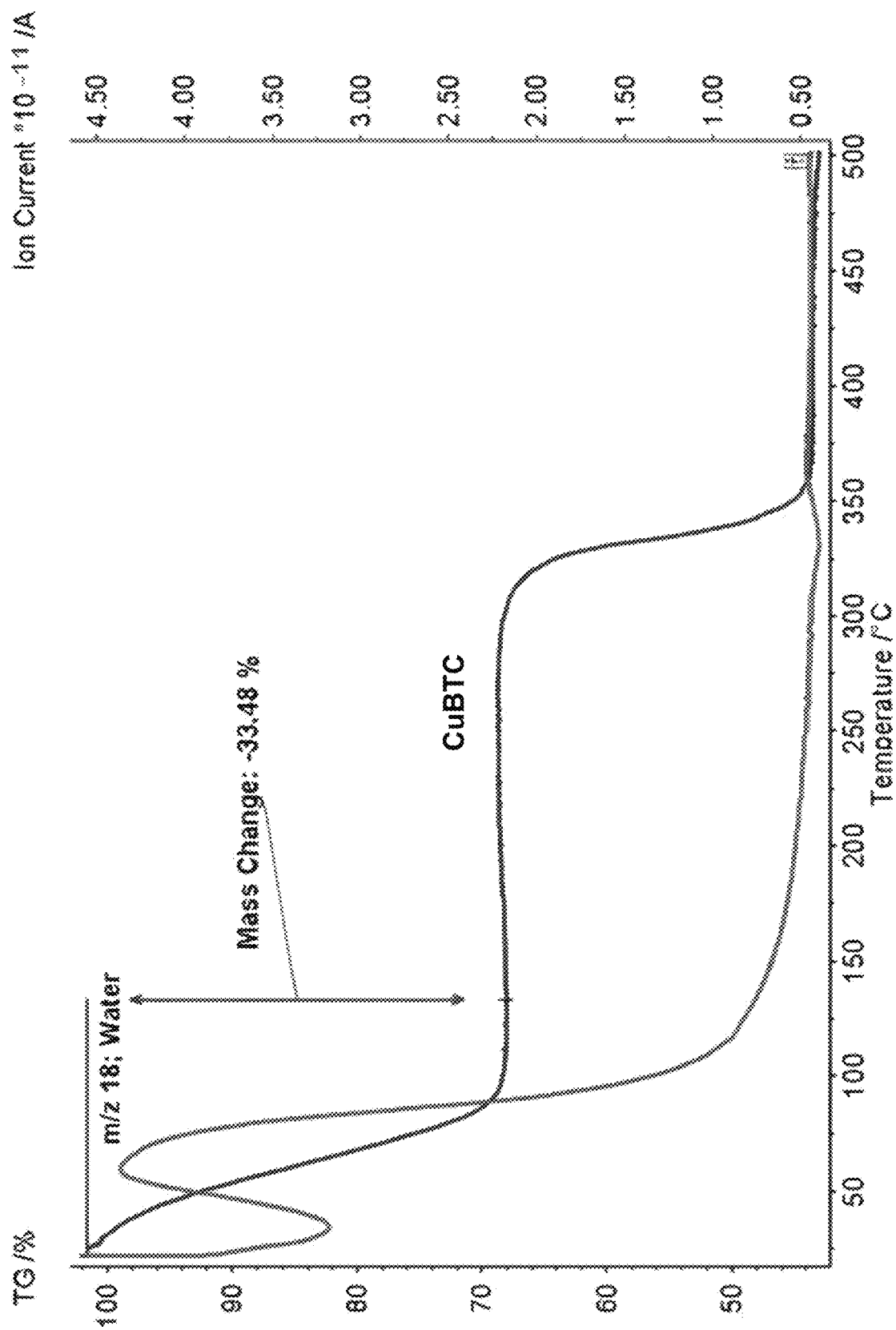

FIG. 3b shows the thermo-gravimetric analysis (TGA) curve of a MOF (Cu-BTC) (Source: PNNL).

Figure 3C:
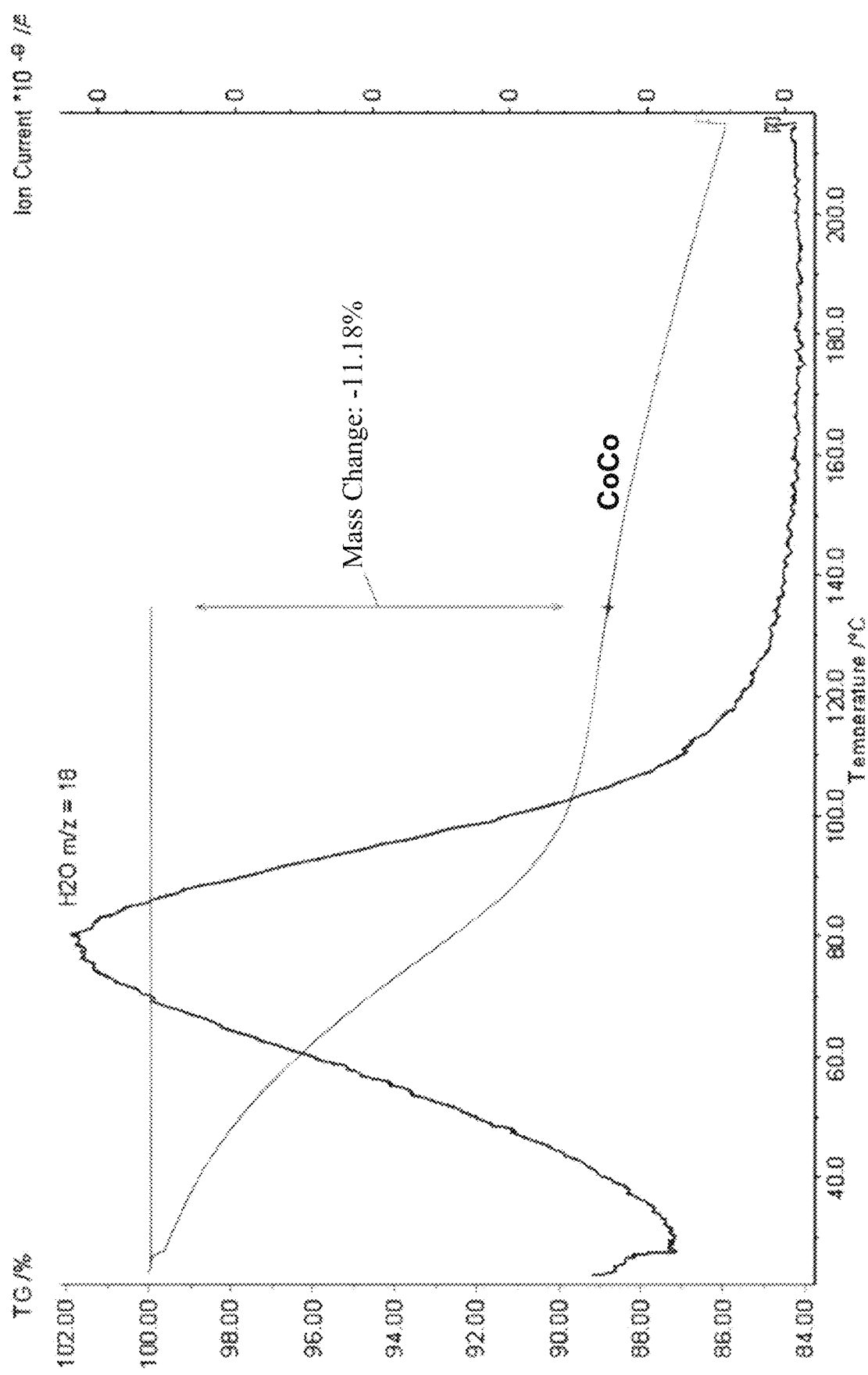

FIG. 3c shows the thermo-gravimetric analysis (TGA) curve of a MOF (CoCo) (Source: PNNL).

FIGS. 1a to 1c, as listed above, demonstrate that MOF adsorption capacities are higher than conventional adsorbents/desiccants. FIG. 2a to 2c, as listed above, show higher adsorption rates (kinetics) for MOFs compared to conventional adsorbents/desiccants. FIGS. 3a to 3c, as listed above, show that MOFs have significantly lower desorption temperatures as compared to conventional adsorbents/desiccants, making them advantageous in terms of energy required for regeneration.

Figure 4A:
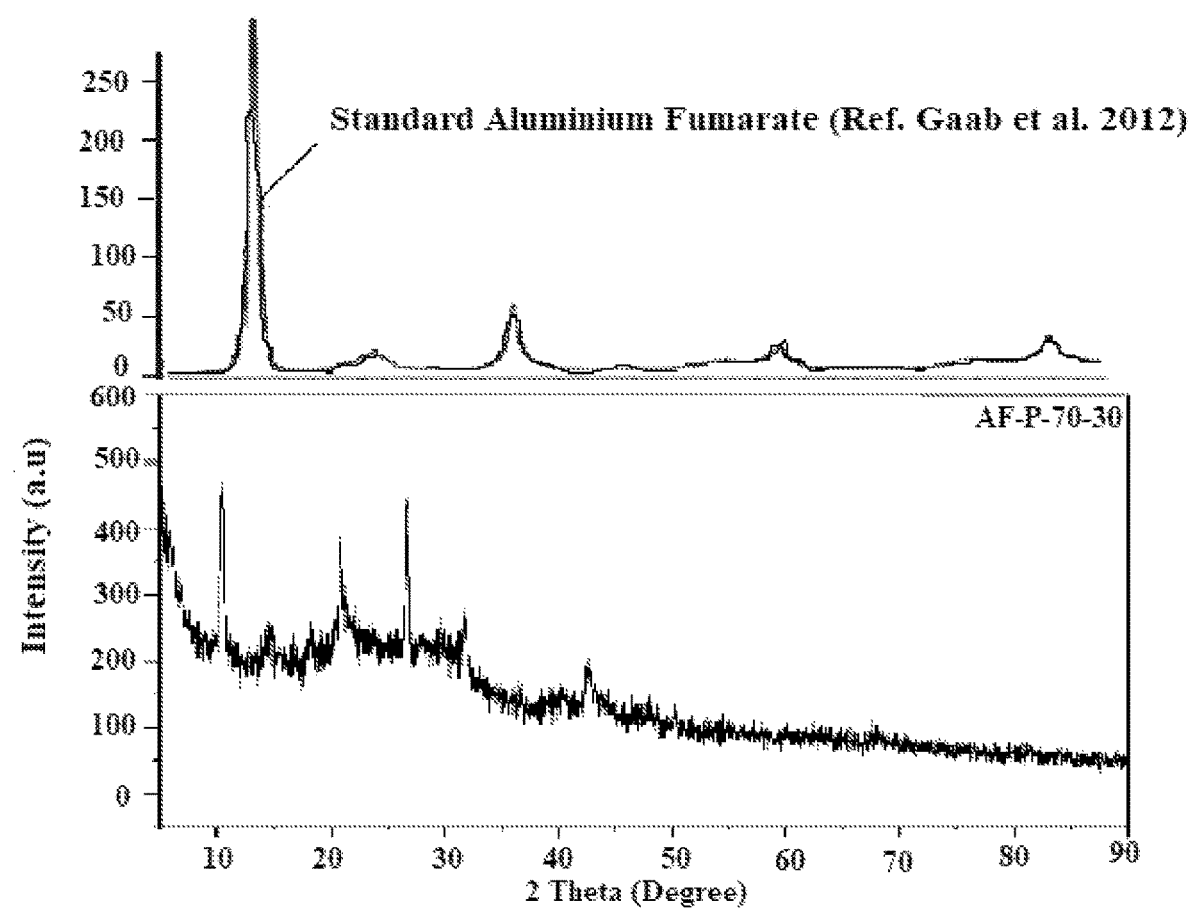

FIG. 4a is an XRD image for aluminium fumarate prepared according to one embodiment of the present invention.

Figure 4B:
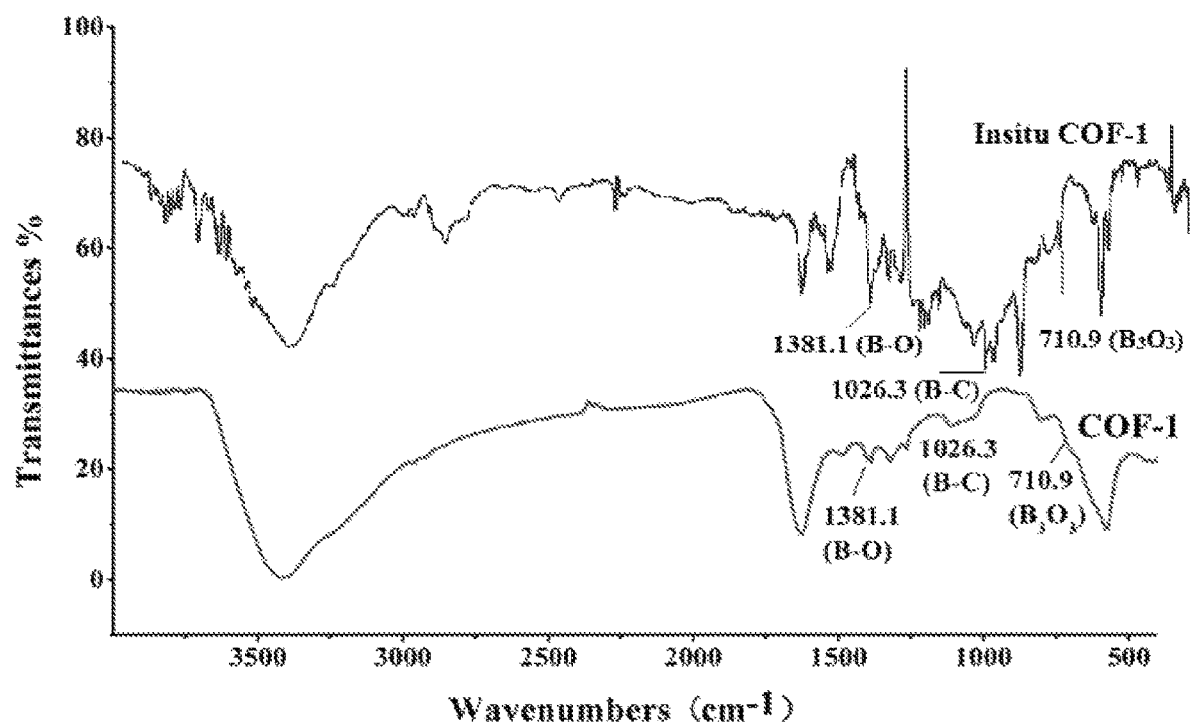

FIG. 4b is an FTIR image for COF-1 prepared according to the method of the present invention.

Figure 4C:
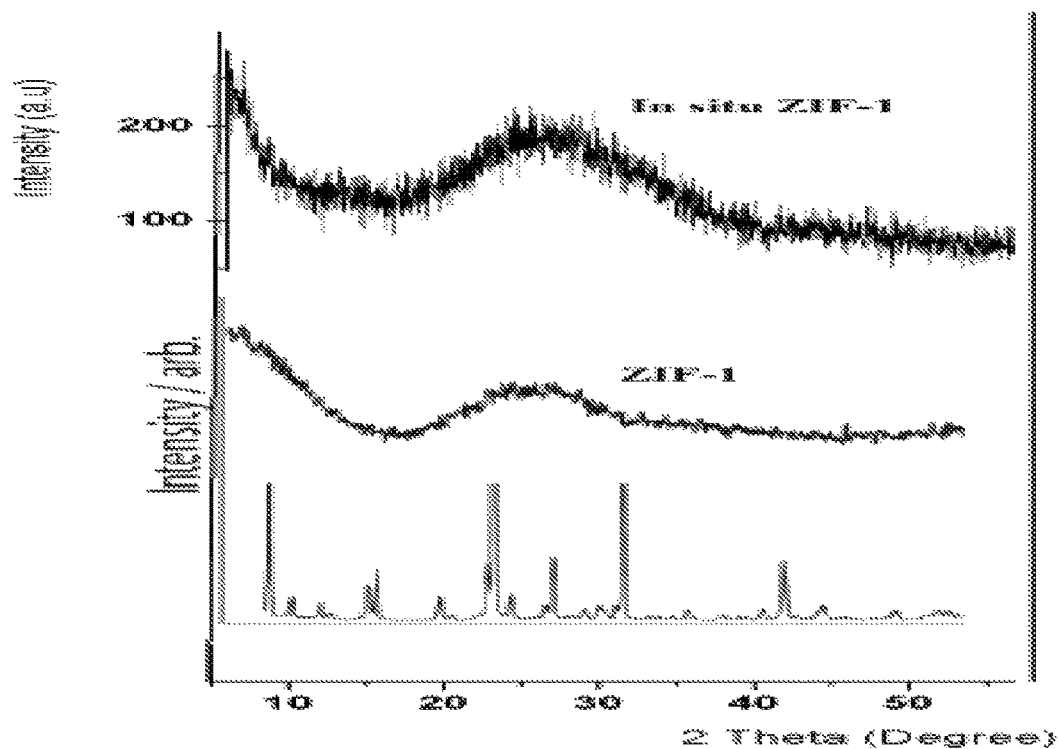

FIG. 4c is an XRD image for ZIF-1 prepared according to the method of the present invention.

FIGS. 4a-4c, as listed above confirm that the material synthesized in situ are respectively a particular MOF, COF and ZIF, confirming the workability of the method of the present invention.

Figure 5A:
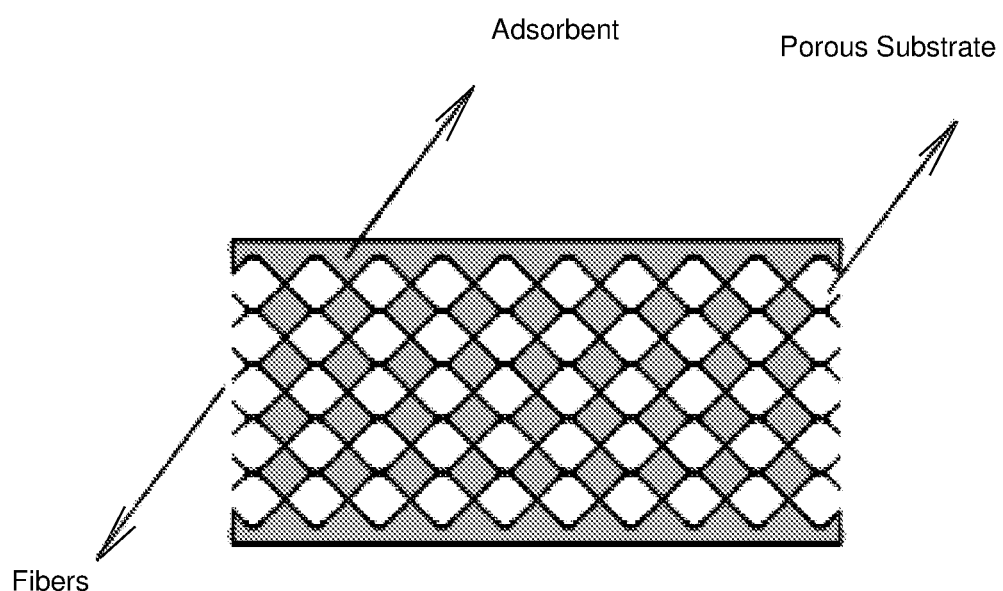

FIG. 5a is a schematic depiction of the cross-sectional view of a porous flat substrate having a MOF synthesized in situ (onto and within the substrate), according to the method of the present invention.

Figure 5B:
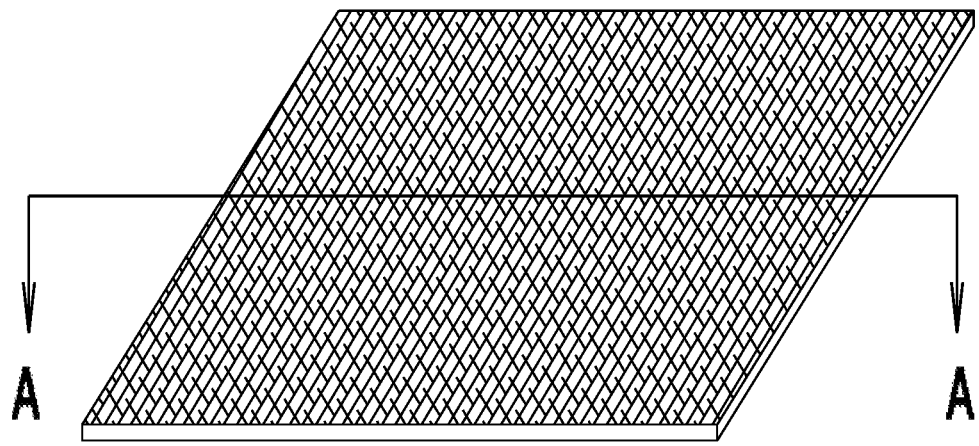

FIG. 5b is a schematic depiction of the perspective view of a porous flat substrate, in a sheet form, having a MOF synthesized in situ (onto and within the substrate), according to the method of the present invention.

Figure 6:
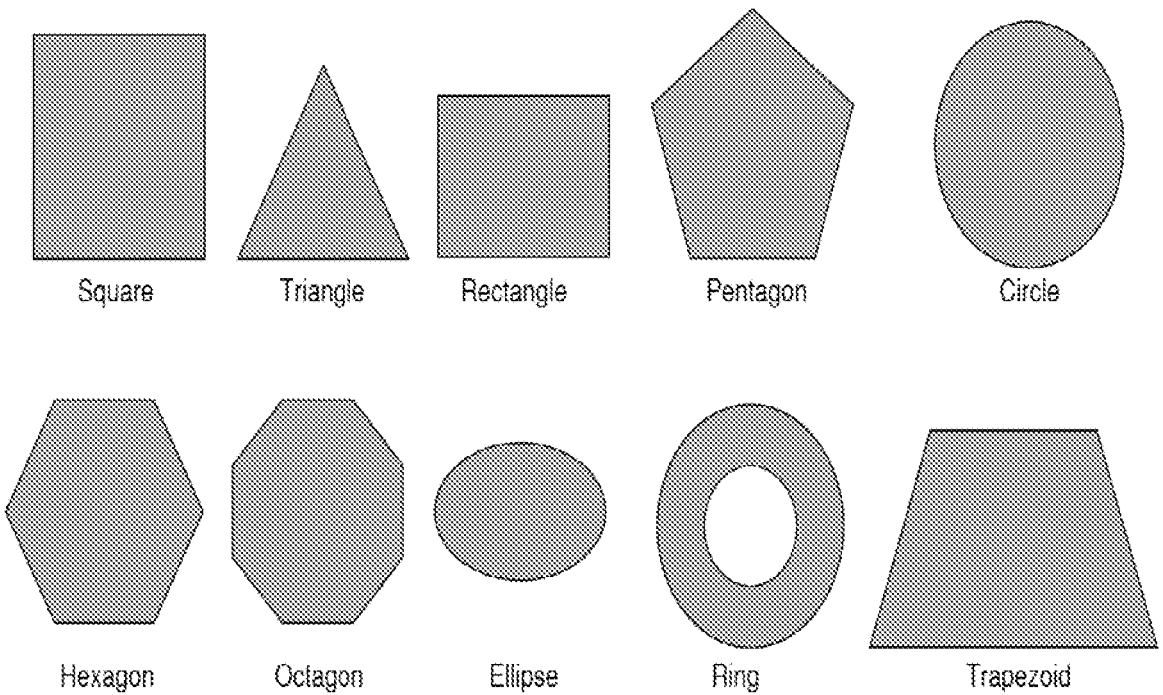

FIG. 6 are illustrative depictions of various matrix shapes wherein a MOF can be synthesized in situ (onto and within the porous substrate) which can be achieved according to the method of the present invention.

Figure 7:
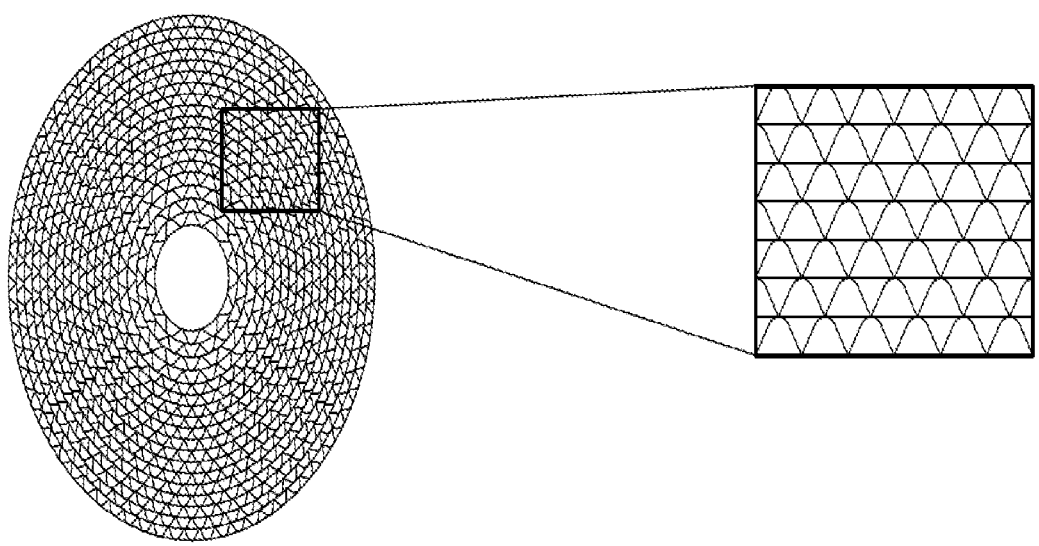

FIG. 7 is an illustrative depiction of a honeycomb matrix typically used in fluid exchange/filtration devices, wherein a MOF is synthesized in situ (onto and within the porous substrate) which can be achieved according to the method of the present invention.

Figure 8:
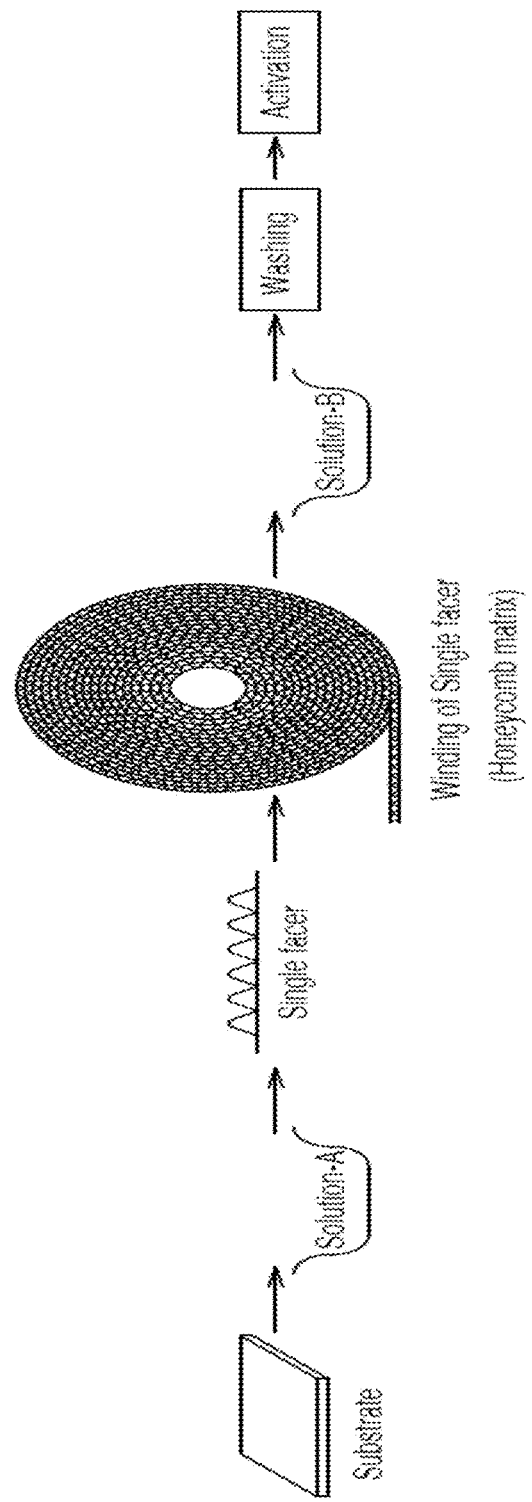

FIG. 8 is a schematic depiction of the in situ synthesisation process according to the present invention showing manufacture of a honeycomb matrix with in situ synthesized aluminium fumarate by sequential dipping.

Figure 9:
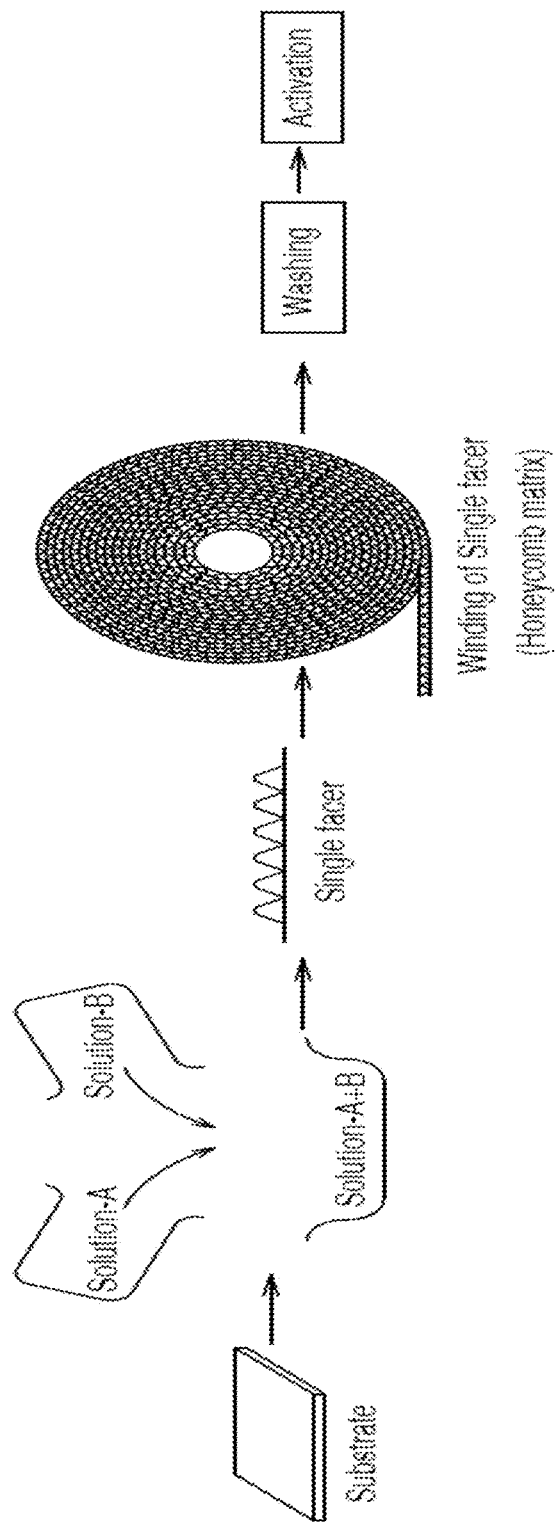

FIG. 9 is a schematic depiction of the manufacture of a honeycomb rotor through a continuous process of synthesis of adsorbent simultaneous and in situ of the substrate passing through the continuously formed mixture of component A and B whereafter it is formed into a honeycomb substrate.

Figure 10:
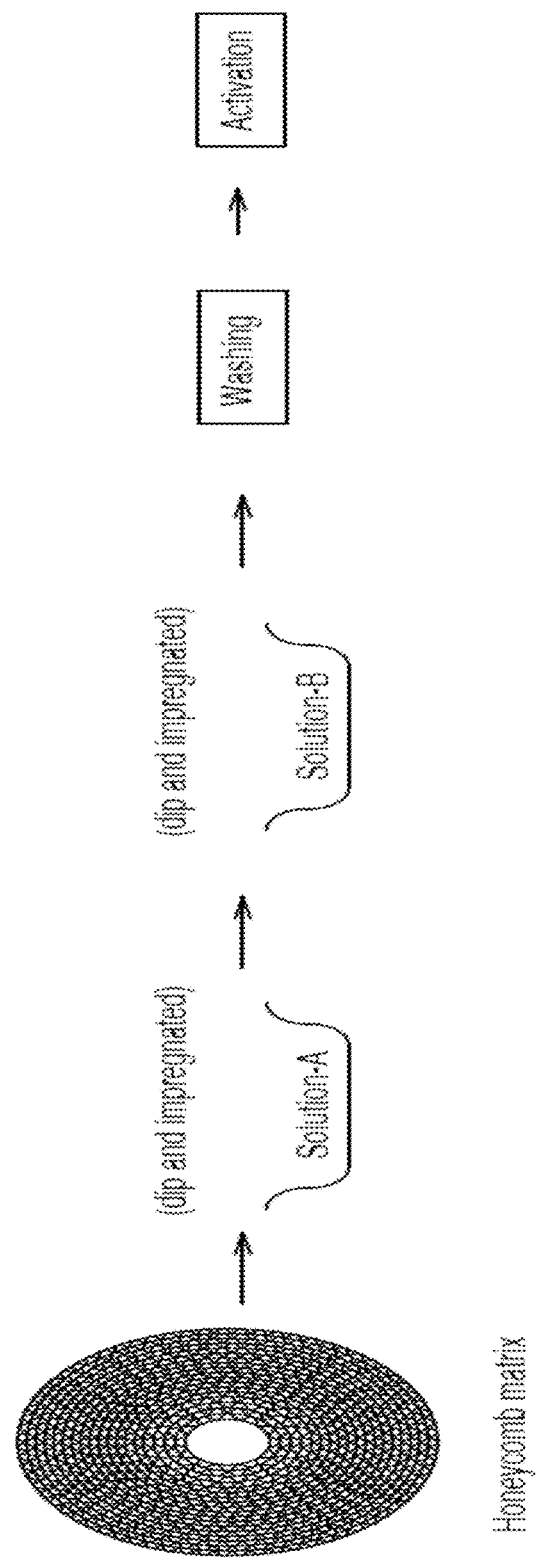

FIG. 10 is a schematic depiction of the manufacture of a preformed honeycomb matrix having a MOF synthesized in situ (onto and within the porous substrate of the honeycomb) according to one embodiment of the invention.

Figure 11:
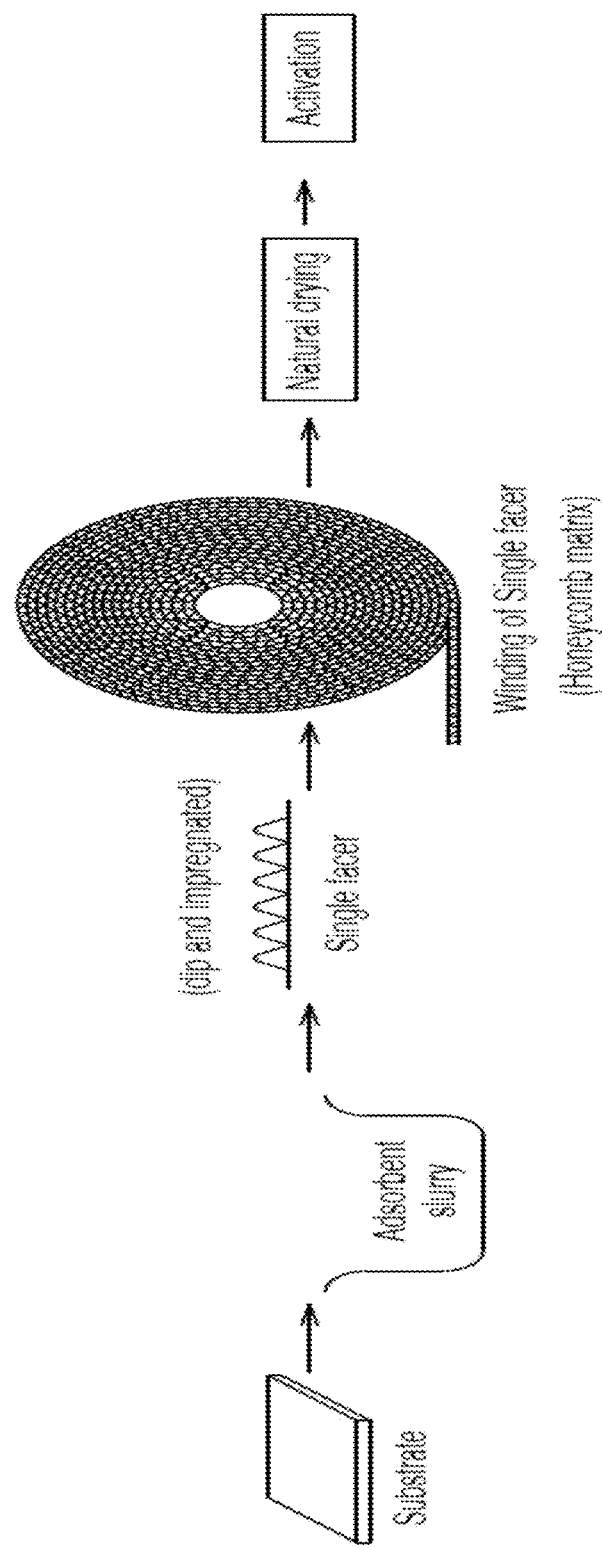

FIG. 11 is a schematic depiction of the manufacture of a honeycomb matrix rotor by impregnating the substrate in a slurry of aluminium fumarate and forming into a honeycomb rotor according to another embodiment of the present invention.

Figure 12:
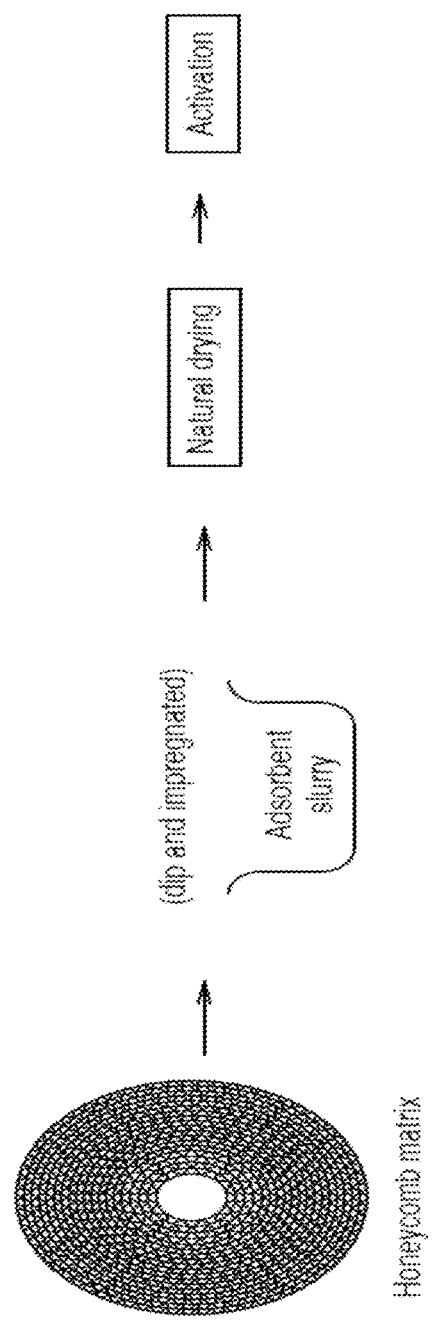

FIG. 12 is a schematic depiction of a pre-prepared honeycomb matrix rotor impregnated by dipping in a slurry of aluminium fumarate according to one embodiment of the present invention.

DETAILED DESCRIPTION OF THE INVENTION

The following description sets out the method of the invention and the implementations required to achieve the embodiments referred to above. The description is illustrative and should not be construed as limiting the scope of the invention. Variations and modifications are possible without departing from the spirit and scope of the invention.

The present invention in a first embodiment therefore provides a novel and inventive method for in situ synthesis of MOFs, COFs and/or ZIFs directly within and onto a substrate, irrespective of the industrial application, or the choice of substrate. As will be appreciated, eliminating or minimizing the dependence on binder systems, the choice of substrates etc., provides great flexibility in use and implementation of these materials.

One advantage of this in-situ preparation method is that it enables providing MOFs/COFs/ZIFs within or onto a substrate in an amount of 0.5 to 6× the basis weight of the substrate. Additionally, the need for a binder system as is required in the prior art, is totally eliminated. The method of the invention enables the preparation of substrates having MOFs, COFs and ZIFs synthesized in situ without the additional steps of coating, curing, etc., that are required when MOF/COF/ZIF powders, prepared as powders, according to the prior art are used.

The present invention provides a method for in situ synthesis of a metal organic framework, a covalent organic framework or a zeolite imidazolate framework within and onto a porous substrate, where all the material synthesized is—fully active material except the substrate.

The present invention also provides specific industrial applications wherein the in situ deposition of MOFs, COFs and/or ZIFs can be employed, including for example, humidity control applications, gas separation applications, gas storage, biodegradable filters, catalytic filters, Carbon recovery applications, sensing applications, energy storage/lithium battery applications, carbon capture, bio-alcohol recovery, drug delivery, etc.

The method of the invention involves preparation of different metal organic frameworks, and zeolite imidazolate frameworks comprising of at least one bidentate organic compound coordinated to at least one metal ion, and in the case of a covalent organic framework at least one organic compound providing a framework which is covalently bonded with the second organic compound. The substrate may or may not be provided with water glass, silica sol or any inorganic or organic material that is used, for example, in substrate corrugation as a rigidifying agent. This is a function of a specific industrial application and is not critical to the working of in situ synthesis of this invention.

The porous substrate in any desired shape or form can be made by selecting from one or more of: glass fibers, ceramic fibres, natural fibers, synthetic fibers, biosoluble fibers, pulp, etc. which allow use of the substrate, with or without additional processing, and synthesized material to 500° C. or higher depending on the thermal stability of the particular MOF/COF/ZIF.

If desired, the substrate can be pre-treated with a rigidifying agent such as silica sol, alumina sol, polyvinyl alcohol, polyvinyl acetate, acrylate, or any other similar non-reactive material such as water glass.

In the method of the invention, the substrate on which the MOF, COF or ZIF is to be synthesized in situ can be a substrate per se or a shaped matrix. The method essentially involves treating the substrate or matrix with a solution comprising monovalent, divalent or trivalent metal salt solution and treatment with a solution of a bidentateortridentate organic compound in solution under desired conditions of time and temperature to aid crystal formation in the case of MOFs. In the case of ZIFs the same method can be replicated replacing the bidentate or tridentate solution with a solution of a heterocyclic aromatic organic compound. The MOF or ZIF are formed in-situ within and onto the substrate at the point of treatment with a second solution. The MOF/ZIF component is not deposited but forms in-situ during reaction of the two solutions directly onto and within the substrate and without requiring a separate binder.

The metal solution can be a solution of a single metal. If the desired MOF has to contain two or more metal ions, then the solution can be a co-solution of two or more different solutions of respective metal ions. Similarly, the use of a mixture of solutions enables the formation of different MOFs. As is evident, in the case of ZIFs where the need is for a zeolitic framework having two or more metal components, or a separate ZIFs, the metal solution can be a mixture of solutions of different metals.

Similarly, the solution of the organic component can be a mixture of solutions of two or more organic linkers/ligands or solutions of two or more heterocyclic aromatic organic compound.

A critical aspect of the present invention is the flexibility of approach during in situ synthesis. The contacting of the substrate with the first and second solutions can be sequential in any order, or simultaneous or even as a co-solution comprising a mixture of both first and second solutions. The rate of reaction (formation of the MOFs, COFs or ZIFs) can be controlled by the use of appropriate reaction accelerators or retardants.

The conditions of time and temperature during the reaction (in situ formation) stage can be controlled in order to tailor the MOF/ZIF/COF loading onto the substrate or matrix. This again provides flexibility in customization of the substrate/matrix for a particular application.

In another embodiment of the invention, the first or the second solution can be provided with other component(s) (such as water glass, inorganic acids), to enable the co-synthesis of the MOF, COF or ZIF with inorganic adsorbent(s). The inorganic adsorbent(s) so formed can be silica gel, and/or metal silicates, or a particular inorganic adsorbent.

In a further embodiment of the invention, an inorganic material (such as zeolites) can be mixed with the first or the second solution such that in situ synthesised MOF, COF or ZIF entraps the inorganic material.

In another embodiment of the invention, the substrate after treatment with the first solution is converted into the desired matrix form, and then treated with the second solution.

In yet another embodiment, the substrate is treated sequentially or simultaneously with both the first and the second solutions and then converted into the desired matrix geometry.

After the treatment with the reactant solutions (first solution and second solution), the substrate/matrix is washed and dried. The drying may be any conventional means such as a drying chamber or through natural drying. The treated substrate may be heated for the purpose of activation.

The metal can be selected from the group consisting of iron, nickel, titanium, zirconium, chromium, aluminium, zinc, tin, lead, magnesium, copper, cobalt, and other monovalent, bivalent, or trivalent metals. The metal component can be used as metal per se or in the form of salts. Examples of the metal salt that can be used include ferric nitrate, ferric chloride, ferrous chloride, chromium nitrate, chromium chloride, aluminium sulphate, aluminium chloride, aluminium bromide, aluminium hydrogensulfate, aluminium dihydrogen phosphate, aluminium monohydrogen phosphate, aluminium phosphate, aluminium nitrate, nickel acetate, zirconium oxychloride, zinc nitrate, zinc acetate, copper acetate, copper nitrate, cobalt nitrate, magnesium nitrate, etc. The aluminium salt is preferably a substance that can provide an aluminium (III) ion. The metal salt can be present in the form of an alkoxide, acetonate, halide, sulfite, as a salt of an organic or inorganic, oxygen comprising acid or a mixture thereof. The alkoxide, for example is, a methoxide, ethoxide, n-propoxide, i-propoxide, n-butoxide, i-butoxide, t-butoxide or phenoxide. An acetonate is, for example, acetylacetonate. A halide is, for example, chloride, bromide or iodide. An organic, oxygen comprising acid is, for example, formic acid, acetic acid, propionic acid or another alkylmonocarboxylic acid. An inorganic oxygen comprising acid is, for example, sulfuric acid, sulfurous acid, phosphoric acid or nitric acid.

The metal component when used in the present invention is usually in the form of an aqueous mixture. Alternatively, the metal salt can also be a suspension or solution in water, or a combination of water and an organic or inorganic solvent. The choice of solvent is dependent on the metal salt in question.

The examples of solvents used are water, methanol, ethanol, n-propanol, iso-propanol, n-butanol, isobutanol, t-butanol, pentanol, hexanol, dimethyl sulfoxide, N,N-dimethyl formamide, N,N-diethyl formamide, toluene, acetonitrile, dioxane, N,N-dimethylacetamide, benzene, chlorobenzene, tetrahydrofuran, ethyl acetate, methyl ethyl ketone, pyridine, sulfolane, glycol, N-methylpyrrolidone, diethyl amine, triethyl amine, gamma-butyrolactone, cyclohexanol, acetylacetonate, mesitylene and other similar aqueous, non-aqueous, aliphatic, aromatic, organic, in-organic solvents and mixture thereof.

The bidentate or tridentate organic compound can be derived from a dicarboxylic acid, such as oxalic acid, tartaric acid, succinic acid, 1,4-butanedicarboxylic acid, 1,4-butenedicarboxylic acid, 4-oxopyran-2,6-dicarboxylic acid, decanedicarboxylic acid, 1,8-heptadecanedicarboxylic acid, 1,6-hexanedicarboxylic acid, heptadecanedicarboxylic acid, acetylene dicarboxylic acid, 1,9-heptadecanedicarboxylic acid, 1,2-benzenedicarboxylic acid, 1,3-benzenedicarboxylic acid, 2,3-pyridinedicarboxylic acid, pyridine-2,3-dicarboxylic acid, 1,4-benzenedicarboxylic acid, p-benzenedicarboxylic acid, imidazole-2,4-dicarboxylic acid, 2-methylquinoline-3,4-dicarboxylic acid, quinoline-2,4-dicarboxylic acid, quinoxaline-2,3-dicarboxylic acid, 6-chloroquinoxaline-2,3-dicarboxylic acid, 1,3-butadiene-1,4-dicarboxylic acid, 4,4'-diaminophenylmethane-3,3'-dicarboxylic acid, quinoline-3,4-dicarboxylic acid, di imidedicarboxylic acid, pyridine-2,6-dicarboxylic acid, 2-methylimidazole-4,5-dicarboxylic acid, 7-chloro-4-hydroxyquinoline-2,8-dicarboxylic acid, thiophene-3,4-dicarboxylic acid, tetrahydropyran-4,4-dicarboxylic acid, perylene-3,9-dicarboxylic acid, 2-isopropylimidazole-4,5- dicarboxylic acid, perylenedicarboxylic acid, Pluriol E 200-dicarboxylic acid, 3,5-cyclohexadiene-1,2-dicarboxylic acid, octanedicarboxylic acid, pentane-3,3-carboxylic acid, 3,6-dioxaoctanedicarboxylic acid, 4,4'-diamino-1,1'-biphenyl-3,3'-dicarboxylic acid, 4,4'-diaminobiphenyl-3,3'-dicarboxylic acid, benzidine-3,3'-dicarboxylic acid, 1,1'-binaphthyldicarboxylic acid, 1,4-bis(phenylamino)benzene-2,5-dicarboxylic acid, 7-chloro-8-methylquinoline-2,3-dicarboxylic acid, 1-anilinoanthraquinone-2,4'-dicarboxylic acid, 1,4-bis(carboxymethyl)piperazine-2,3-dicarboxylic acid, phenylinanedicarboxylic acid, 7-choroquinoline-3,8-dicarboxylic acid, polytetrahydrofuran 250-dicarboxylic acid, 1-(4-carboxy)phenyl-3-(4-chloro)phenylpyrazoline-4,5-dicarboxylic acid, 1,4,5,6,7,7-hexachloro-5-norbornene-2,3-dicarboxylic acid, 1,3-dibenzyl-2-oxoimidazolidine-4,5-dicarboxylic acid, 1,4-cyclohexanedicarboxylic acid, naphthalene-1,8-dicarboxylic acid, 1,3-dibenzyl-2-oxoimidazolidine-4,5-cis-dicarboxylic acid, 2,2'-biquinoline-4,4'-dicarboxylic acid, 2-benzoylbenzene-1,3-dicarboxylic acid, pyridine-3,4dicarboxylic acid, 3,6,9-trioxaundecanedicarboxylic acid, Pluriol E 300 dicarboxylic acid, Pluriol E 400-dicarboxylic acid, hydroxybenzophenonedicarboxylic acid, Pluriol E 600-dicarboxylic acid, pyrazole-3,4-dicarboxylic acid, bis(4-aminophenyl)sulfone diimide-dicarboxylic acid, 5,6-dimethyl-2,3-pyrazinedicarboxylic acid, bis(4-aminophenyl) ether diimide-dicarboxylic acid, 2,3-pyrazinedicarboxylic acid, 4,4'-diaminodiphenylmethane diimide-dicarboxylic acid, 1,4-naphthalenedicarboxylic acid, 1,3-adamantanedicarboxylic acid, 1,8-naphthalenedicarboxylic acid, 2,6-naphthalenedicarboxylic acid, 2,3-naphthalenedicarboxylic acid, 8-methoxy-2,3-naphthalenedicarboxylic acid, 8-sulfo-2,3-naphthalenedicarboxylic acid, anthracene-2,3-dicarboxylic acid, 8-nitro-2,3-naphthalenecarboxylic acid, 2',3'-diphenyl-p-terphenyl-4,4"-dicarboxylic acid, (diphenyl ether)-4,4'-dicarboxylic acid, 4(1H)-oxothiochromene-2,8-dicarboxylic acid, imidazole-4,5-dicarboxylic acid, 5-tert-butyl-1,3-benzenedicarboxylic acid, 7,8-quinolinedicarboxylic acid, 4,5-imidazoledicarboxylic acid, or derived from a tricarboxylic acid such as 1,3,5-benzenetricarboxylic acid, 1,3,5-tris(4-carboxyphenyl)benzene, and the like.

Viscosity enhancers/additives are added to increase the loading onto the substrate. Examples of additives include xanthan gum, sodium alginate, hydroxypropylmethylcellulose, guar gum, starch, ethylene glycol, etc.

In the case of ZIFs, the organic ligand is usually selected from the group of heterocyclic aromatic organic compounds consisting of imidazole, benzimidazole, chlorobenzimidazole, nitroimidazole, 2-methylimidazole, imidazole-2-carboxyaldehyde, etc. This may be dissolved in an organic solvent or in water. The metal component is usually a metal such as zinc, or cobalt or iron, in salt form. The actual form used may be powder form or may be dissolved in a solvent whether organic or water or inorganic.

In the case of covalent organic frameworks, the materials include 1,3,5-triformylphloroglucinol, 1,4-benzenediboronic acid, tert-butylsilanetriol and p-phenylenediamine for example. The components can be dissolved in solvents such as 1,2-dichloroethane, 1,4-dioxane, toluene, mesitylene-dioxane mixture, etc.

The significance of the method of the invention is that in most cases the sequence of impregnation to reaction is not reactant specific. Thus, for example, either group of materials can be impregnated into the porous substrate, and then the substrate treated with the other group to form the MOF/COF or ZIF in situ. This also allows for control of loading as well as depth of loading, as well as uniformity of loading, and also effectively does away with the need to use a binder system to adhere the MOF to the substrate.

While the following discussion refers to certain specific MOFs, it is not to be interpreted in a limiting manner since the method of in situ formation can be utilized for formation of non-exemplified MOFs, COFs or ZIFs as well with suitable process modifications.

In the case of MIL-100(Fe), the preparation method comprises mixing 1,3,5-benzene tricarboxylic acid in an organic solvent such as ethanol or dimethyl formamide. A second solution of an iron salt such as ferric nitrate is prepared—again as an aqueous solution or as a solution in an organic solvent such as methanol. The porous substrate can be treated with either solution followed by treatment with the second solution. The sequence of treatment is not critical. The second treatment is carried out at a specific time and temperature so as to form the MOF in situ and to a loading of up to 6×GSM or more on the porous substrate basis weight.

In the case of aluminium fumarate, the porous metal organic framework is formed by the coordination of the fumarate ions with Aluminium (III) ions. The framework is formed in-situ onto and within the substrate. The source of bidentate fumarate ions is fumaric acid and that of aluminium (III) ion is aluminium sulphate. The metal organic framework produced is a result of reaction of aluminium compound and bidentate organic compound in aqueous medium in presence of a base at different reaction temperatures and reaction times.

The porous framework contains at least one bidentate ligand based on fumaric acid and a trivalent metal salt based on aluminium ions. The powdered aluminium fumarate formed is adhered onto the surface of a substrate by using suitable inorganic or organic binders. Water is used as a solvent in the reaction. Simple alkali metal hydroxides, preferably sodium hydroxide or potassium hydroxide are used.

In another embodiment of the invention, MOFs, COFs and ZIFs prepared in situ, or by prior art techniques, are also useful in heat exchange or adsorption applications. For shaped matrices, e.g. honeycomb matrix, the use of MOF, COF or ZIF prepared in situ, or by dry/wet methods of the prior art, or by a method of coating/depositing have shown tremendous advantages of lower regeneration temperatures, and hence lower energy usage, faster moisture uptake, and very high adsorption uptake, over use of prior art zeolites or silica gel techniques.

The present invention also provides a method for the formation by in situ synthesis or by deposition, of metal organic framework in or on heat exchanger elements that are suitable for low, medium or high humidity applications, and to such humidity exchanger elements.

The applicants herein have earlier shown the advantages of in situ synthesis of metal silicates microporous desiccants in honeycomb structures used in humidity control applications, as compared to generated and then coated systems. The use of in situ synthesized MOFs, or COFs or ZIFs in a honeycomb structure can be expected to provide greater advantages than coated MOFs/COFs or ZIFs, particularly since the depth of formation will be higher than prior art. Preliminary studies have shown synthesized/deposited active material at levels of up to 6×GSM as compared to prior art claimed (but not established or substantiated) figures of up to 100 GSM as disclosed in U.S. Pat. No. 8,697,191.

The present invention also relates to a humidity exchanger element suitable for low, medium and high humidity applications, produced by laminating corrugated paper and liner paper with many small channels, having active Metal Organic Framework (MOF) synthesized in-situ or deposited using porous or non-porous substrate. The material, in powder or granular form, is also suitable for use in humidity exchange. A significant advantage of the method of the invention is that it enables the user to choose the level of loading of the in situ synthesized MOF, COF or ZIF depending on his/her specific need. Thus, even loadings as low as 0.2% to as high as 600% of adsorbent (based on bare weight of substrate) can be chosen depending on specific industrial application, and practiced.

The above disclosure is non-limiting and variations and modifications are possible without departing from the spirit and scope of the invention in any manner. The following examples set out the various embodiments of the invention involving the in situ synthesis of MOFs, COFs and ZIFs using the method of the invention.

EXAMPLES

All the following examples utilize glass fiber substrate having porosity capable of holding up to 6 to 8 times of water glass of its own weight. The steps of drying where carried out were using natural drying. Activation is done at 140° C. for 2 hours.

Example 1: In Situ Synthesis of Aluminium Fumarate

A: Using Untreated Substrate

Example 1a: Using Potassium Hydroxide without Additive

Solution A is prepared in three parts by dissolving potassium hydroxide in water, followed by adding fumaric acid under stirring, wherein the ratios of the constituents are different as set out in Table 1a below. Solution B is prepared by dissolving 100 gms of aluminium sulphate in 500 ml of water. The substrate has a basis weight of 33 GSM. Solution B and the substrate are also divided into three separate parts—each to be used with one respective part of solution A. The substrate is soaked in a respective part of Solution A at room temperature and then dried naturally. The dried substrate is then treated with Solution B at a temperature of 80-C and for a time period of 15 minutes to initiate the reaction. After completion of the reaction, the substrate is washed with water to remove any by-products and then subjected to natural drying, followed by activation in a drying chamber. The loading percentage of in situ synthesized MOF (aluminium fumarate) on the substrate was studied. The quantities of the ingredients in solution A and the results of the tests are given in Table 1a below.

Example 1b: Using Potassium Hydroxide with Additive and Increasing the Number of Dippings Solution A is prepared as three parts, each by dissolving 120 gms of potassium hydroxide in 450 ml of water followed by addition of 99 gms of fumaric acid under stirring, followed by addition of 2 gm of xanthan gum as additive. Solution B is prepared by dissolving 100 gms of aluminium sulphate in 200 ml of water. The substrate is of 33 GSM basis weight. The substrate parts are subjected to soaking in Solution A parts with different number of dippings (2, 3, and 4 respectively) and with intermediate drying to result in an enhanced loading of component/reactant A, followed by a final drying, before being soaked in the respective part of Solution B to initiate in situ formation of the aluminium fumarate on the substrates. The reaction temperature is 75-C and the reaction time is 30 minutes. The substrates are then each washed to remove by-products followed by natural drying and by activation in a drying chamber. The loading percentage of in situ synthesized MOF and the effect of successive dippings on loading percentage were studied. The water adsorption at 50% RH was studied using Belsorp Aqua 3. The results are given in Table 1b below. The 35% adsorption correlates very well with the highest literature-reported adsorption of 33-38% for aluminium fumarate at 50% RH.

TABLE 1b

| Sl No. | No. of dipping | Adsorbent loading % on substrate | Substrate:Adsorbent | GSM of adsorbent | % water adsorption at RH-50 |
| --- | --- | --- | --- | --- | --- |
| 1 | 2 | 104 | 49:51 | 33.6 | 32.3 |
| 2 | 3 | 158 | 38:62 | 54 | 30.3 |
| 3 | 4 | 197 | 33:67 | 67 | 34.7 |

Example 1c: Using Potassium Hydroxide with Silica Sol and Additive

The protocol of Example 1a was followed except that seven parts of Solution A were prepared with differing amounts of potassium hydroxide and xanthan gum additive. Silica sol is also added to the solution A under continuous mixing. Solution B is identical to Example 1b above. Substrate comprised of basis weight of 33 GSM. The substrate parts were dipped in respective parts of the Solution B at differing temperatures and times. This was followed by washing, natural drying and activation in a drying chamber. The effect of differing amounts of reactants in Solution A, reaction times and reaction temperatures on loading percentage were studied. The details are given in Table 1c below.

TABLE 1a

| | Solution-A | | | | | | |
| Sl No. | KOH (g) | Fumaric acid (g) | Water (mL) | Adsorbent loading % on substrate | Substrate:Adsorbent | GSM of Adsorbent | % water adsorption at RH-50 |
| --- | --- | --- | --- | --- | --- | --- | --- |
| 1 | 123 | 110.6 | 260 | 75 | 57:43 | 31.5 | 30 |
| 2 | 118 | 105 | 260 | 49 | 67:33 | 20 | 27 |
| 3 | 99.2 | 99.3 | 250 | 85 | 54:46 | 34 | 30 |

TABLE 1c

| Sl No. | KOH (g) | Solution-A Fumaric acid (g) | Water (mL) | Additive (g) | Silica Sol (mL) | Reaction temperature (° C.) | Reaction time (min) | Adsorbent loading % on substrate | Substrate:Adsorbent | GSM of adsorbent |
|---|---|---|---|---|---|---|---|---|---|---|
| 1 | 100 | 99 | 450 | 1   | 30 | 45 | 15 | 108 | 43:57 | 45 |
| 2 | 100 | 99 | 450 | 1.5 | 30 | 45 | 15 | 126 | 44:56 | 43 |
| 3 | 100 | 99 | 450 | 2   | 30 | 45 | 15 | 132 | 41:59 | 45 |
| 4 | 120 | 99 | 450 | 2   | 30 | 70 | 30 | 115 | 46:54 | 39.2 |
| 5 | 120 | 99 | 450 | 2   | 30 | 40 | 60 | 165 | 38:62 | 56 |
| 6 | 120 | 99 | 450 | 2   | 30 | 80 | 45 | 111 | 47:53 | 38 |
| 7 | 120 | 99 | 450 | 2   | 30 | 75 | 60 | 98  | 50:50 | 33 |

Example 1d: Using Potassium Hydroxide with Polyvinyl Alcohol and Additive 6 parts of Solution A were prepared using the protocol of Example 1c except that polyvinyl alcohol is added instead of silica sol under mixing. The amounts of potassium hydroxide, xanthan gum additive, and polyvinyl alcohol are varied. Solution B is prepared as in Example 1b. The substrate comprises of basis weight 33 GSM. The procedure of Example 1c is followed for treatment of substrate with Solution A and Solution B, except that the reaction temperatures and times are varied. The loading percentage of MOF synthesized in situ on substrate and effect of varying reactant amounts, reaction temperatures and reaction times on loading percentage as well as on adsorption percentage at 50% RH is studied. The adsorption percentage studies are done on a Belsorp Aqua 3. Process details are in Table 1d below. Sample 3 in Table 1d below was cross-verified by XRD with characteristics peaks at 2Θ position 10.410, 14.750, 18.270, 20.810, and 26.570, which confirmed the formation of in situ aluminium fumarate. The XRD is shown in FIG. 4a.

Solution A are then dipped/soaked in a separate part of solution B respectively for a given a temperature but different times to obtain different amounts of in situ synthesis of aluminium fumarate onto and within the substrate, followed by natural drying. The substrates are then washed with water to remove any by-products formed during the reaction, subjected to natural drying, followed by activation in a drying chamber. Each part of Solution A comprised 25.2 gms of NaOH dissolved in 200 ml of water to which the amount of fumaric acid added was 24.3 gms. The basis weight of the substrate was 33 GSM. Solution B comprised 100 gms of Aluminium sulphate dissolved in 500 ml of water. The reaction temperature was 80° C. The effect of reaction time on loading percentage (in situ synthesized MOF on substrate) was studied. The results obtained are given in Table 1e below.

TABLE 1d

| Sl No. | KOH (g) | Solution-A Fumaric acid (g) | Water (mL) | Additive (g) | PVA (mL)- 10% solution | Reaction temperatre (° C.) | Reaction time (min) | Adsorbent loading % on substrate | Substrate:Adsorbent | GSM of adsorbent | % water adsorption at RH-50 |
|---|---|---|---|---|---|---|---|---|---|---|---|
| 1 | 100 | 99 | 450 | 1   | 30 | 45 | 15 | 131 | 54:46 | 45   | 32.82 |
| 2 | 100 | 99 | 450 | 1.5 | 20 | 45 | 15 | 136 | 42:58 | 46   | 31.5 |
| 3 | 120 | 99 | 450 | 2   | 30 | 70 | 30 | 115 | 46:54 | 39.2 | 32 |
| 4 | 120 | 99 | 450 | 2   | 30 | 80 | 30 | 80  | 55:45 | 27   | 33.1 |
| 5 | 120 | 99 | 450 | 2   | 30 | 40 | 60 | 115 | 46:54 | 39   | 30 |
| 6 | 120 | 99 | 450 | 2   | 30 | 75 | 60 | 92  | 52:48 | 31   | 30.2 |

B: Using Pretreated Substrate

Example 1e. Using Sodium Hydroxide and without Additive

Solution A is prepared in 5 parts at ambient temperature by dissolving sodium hydroxide in water. Fumaric acid is then added to it with continuous stirring to get a solution of sodium fumarate. A substrate is pre-treated with 5% silica sol and dried naturally, and divided into 5 equal parts. Each pre-treated substrate part is soaked in a respective part of Solution A at room temperature and then dried naturally. Solution-B is prepared as 5 parts by dissolving aluminium sulphate in water at ambient temperature. Each of the 5 pre-treated substrate parts already dipped or soaked in TABLE 1e

| Sl No. | Reaction time (min) | Substrate:adsorbent | Loading % of adsorbent on substrate | GSM of adsorbent |
|---|---|---|---|---|
| 1 | 30  | 61:39 | 64.9  | 21.66 |
| 2 | 60  | 58:42 | 71.4  | 23.82 |
| 3 | 90  | 41:59 | 143.2 | 48.78 |
| 4 | 120 | 41:59 | 143.6 | 48.92 |
| 5 | 150 | 41:59 | 145.4 | 49.54 |

Example 1f. Using Sodium Hydroxide, with Additive

The procedure as set out in Example 1e was followed except that during preparation of Solution A, 0.5 gms of xanthan gum is also added after the addition of fumaric acid under stirring, followed by further stirring. The basis weight of the substrate was 33 GSM. The effect of additive on reaction time, reaction temperature and loading percentage (of in situ synthesized MOF on substrate) was studied. The results obtained are set out in Table 1f below.

TABLE 1f

| Sl No. | Reaction temperature (° C.) | Reaction time (min) | Substrate:adsorbent | Loading % of adsorbent on substrate | GSM of adsorbent |
|---|---|---|---|---|---|
| 1 | 40 | 15 | 54:46 | 85.14 | 29.34 |
| 2 | 40 | 30 | 45:55 | 120 | 41.36 |
| 3 | 40 | 60 | 45:54 | 116 | 40.08 |
| 4 | 80 | 15 | 35:65 | 182 | 62.74 |
| 5 | 80 | 30 | 37:63 | 169 | 58.12 |

Example 1g. Using Potassium Hydroxide with Additive

The procedure set out in Example 1f is followed except that in the preparation of Solution A, instead of sodium hydroxide, 120 gms of potassium hydroxide is used in 450 ml of water with 99 gms of fumaric acid. The amount of xanthan gum additive is 2 gms. The basis weight of the substrate is 33 GSM. Effect of varying reaction temperature on loading percentage of in situ synthesized MOF on the substrate is studied. The results are in Table 1g below:

TABLE 1g

| Sl No. | Reaction temperature (° C.) | Reaction time (min) | Substrate: adsorbent | Loading % of adsorbent on substrate | GSM of adsorbent |
|---|---|---|---|---|---|
| 1 | 80 | 15 | 28:72 | 251.9 | 100.5 |
| 2 | 90 | 15 | 30:70 | 231.1 | 92.2 |
| 3 | 110 | 15 | 37:63 | 167.4 | 66.8 |

Example 1h: Using Sodium Hydroxide, Polyvinyl Alcohol, with Additive

The procedure set out in Example 1e is followed except that following the addition of fumaric acid, 0.5 gms of xanthan gum additive is also added, followed by further stirring. Thereafter, 10 ml of a 10% solution of polyvinyl alcohol is also added to the resulting solution and mixed well. Solution B comprises 100 gms of Aluminium sulphate in 200 ml of water. The basis weight of the substrate is 33 GSM. The effect of different reaction temperatures and reaction times on loading percentage of in situ synthesized MOF in substrate is studied, and the results are given in Table 1h below.

TABLE 1h

| Sl No. | Reaction temperature (° C.) | Reaction time (min) | Substrate:adsorbent | Loading % of adsorbent on substrate | GSM of adsorbent | Water adsorption % at RH-50 |
|---|---|---|---|---|---|---|
| 1 | 40 | 15 | 42:58 | 138.5 | 46.68 | 26.7 |
| 2 | 40 | 30 | 45:55 | 122.5 | 41.3 | 28.5 |
| 3 | 40 | 60 | 47:53 | 113.6 | 38.28 | 25.6 |
| 4 | 80 | 15 | 53:47 | 89.8 | 30.28 | 27.7 |
| 5 | 80 | 30 | 57:43 | 74.2 | 25.02 | 25.7 |
| 6 | 80 | 60 | 67:33 | 49.3 | 16.62 | 19.3 |

In all the above examples, the loading of the in situ synthesized aluminium fumarate onto and within the substrate is measured by taking the differential in actual weight between the bare substrate and the loaded substrate and dividing the result by the bare weight of the substrate. It is found to be in the range between 0.1× to 6× the weight of the bare substrate.

Example 2: In Situ Synthesis of MIL-100 (Fe)

A: Using Untreated Substrate

Example 2a: Using Sodium Hydroxide+with Additive+Ferric Chloride 6 parts of Solution A was prepared by dissolving different quantities of 1,3,5,-benzenetri carboxylic acid in a solution of 10 gms of sodium hydroxide in 250 ml of water, followed by adding differing amounts of xanthan gum as additive under stirring. Solution B is prepared by dissolving 30 gms of ferric chloride in 500 ml of water. The substrate comprising basis weight of 33 GSM is prepared as 6 parts. Each part is dipped in a respective part of Solution A, followed by natural drying, followed by dipping in Solution B to initiate reaction. The reaction temperatures and times are varied. This is followed by washing, natural drying and activation in a drying chamber. Loading percentage of synthesized MOF on substrate, and effect of temperature and time variation on loading percentage are studied. The results are in Table 2a below.

TABLE 2a

| | Solution-A | | | | | | | |
|---|---|---|---|---|---|---|---|---|
| Sl No. | NaOH (g) | 1,3,5 BTC (g) | Water (mL) | Additive (g) | Reaction temperature (° C.) | Reaction time (Hrs) | Adsorbent loading % on substrate | Substrate:Adsorbent | GSM of adsorbent |
| 1 | 10 | 10.4 | 250 | 0.75 | 80 | 0.5 | 118 | 46:54 | 49 |
| 2 | 10 | 10.4 | 250 | 0.75 | 90 | 6 | 84 | 54:46 | 29 |
| 3 | 10 | 10.4 | 250 | 0.75 | 90 | 8 | 315 | 24:76 | 107 |
| 4 | 10 | 10.4 | 250 | 0.75 | 90 | 10 | 338 | 23:77 | 115 |
| 5 | 10 | 13 | 250 | 1 | RT* | 8 | 79 | 56:44 | 27 |
| 6 | 10 | 13 | 250 | 1 | RT* | 12 | 71 | 58:42 | 24 |

*RT = room temperature

Example 2b: Using Sodium Hydroxide+with Additive+Ferric Nitrate

The procedure of Example 2a was followed except that Solution A is prepared by dissolving 13 gms of 1,3,5-Benzene tricarboxylic acid in aqueous basic medium of 10 gms of sodium hydroxide in 250 ml of water, followed by addition of 1 gm of xanthan gum under continuous stirring and solution B is prepared by dissolving 30 gms of ferric nitrate in 500 ml of water. The substrate has a basis weight of 33 GSM. The dipping and reaction protocol are as set out in Example 2a. The reaction temperature is kept at 95-C while the reaction time is varied. The effect of varying reaction times on loading percentage of in situ synthesized MOF on substrate is studied. The results are given in Table 2b below.

TABLE 2b

| Sl No. | Reaction time (Hrs) | Adsorbent loading % on substrate | Substrate: Adsorbent | GSM of adsorbent |
|---|---|---|---|---|
| 1 | 6 | 243 | 29:71 | 82 |
| 2 | 8 | 240 | 29:71 | 82 |
| 3 | 10 | 231 | 30:70 | 78 |

Example 2c: Using Sodium Hydroxide+with Additive+Polyvinyl Alcohol+Ferric Chloride The protocol of Example 2a is followed except that Solution A is prepared by dissolving 10.4 gms of 1,3,5-Benzene tricarboxylic acid in aqueous basic medium of 10 gms of sodium hydroxide in 250 ml water, followed by addition of 0.75 gms of xanthan gum with continuous stirring followed thereafter by addition of 10 ml of polyvinyl alcohol. Solution-B is prepared by dissolving 30 gms of ferric chloride in 500 ml of water. The protocol of dipping of substrate (having 33 GSM) in Solution A and B is the same as in Example 2a. the reaction temperatures and reaction times are varied. The effect of varying reaction times and temperatures on loading of in situ synthesized MOF on substrate is studied. The process details are in Table 2c below.

TABLE 2c

| Sl No. | Reaction temperature (° C.) | Reaction time (Hrs) | Adsorbent loading % on substrate | Substrate: Adsorbent | GSM of adsorbent |
|---|---|---|---|---|---|
| 1 | 80 | 0-.5 | 135 | 43:57 | 56 |
| 2 | 90 | 8 | 187 | 34:66 | 64 |

Example 2d: Using Sodium Hydroxide+with Additive+Polyvinyl Alcohol+Ferric Nitrate The procedure, reactants are identical as in Example 2c, except that Solution B is prepared by dissolving 30 gms of ferric nitrate in 500 ml of water. The reaction temperature is 90-C and the reaction times are varied. The results are given in Table 2d below.

TABLE 2d

| Sl No. | Reaction time (Hrs) | Adsorbent loading % on substrate | Substrate: Adsorbent | GSM of adsorbent |
|---|---|---|---|---|
| 1 | 10 | 188 | 35:65 | 64 |
| 2 | 12 | 129 | 44:56 | 44 |

Example 2e: Using Ethanol as Solvent+with Additive+Ferric Nitrate

The procedure of Example 2a was followed with Solution A being prepared by dissolving 12 gms of 1,3,5-Benzene tricarboxylic acid in a mixture of ethanol-water in a ratio of 1:1 (100 ml each) followed by addition of 0.5 gms of hydroxypropyl methyl cellulose additive under continuous stirring. Solution B is prepared by dissolving 30 gms of ferric nitrate in 500 ml of water. The substrate is of basis weight 33 GSM. Reaction temperature is kept at 90-C while reaction time is varied. The effect of varying reaction time on loading percentage of in situ synthesized MOF on substrate was studied. The results are given in Table 2e below.

TABLE 2e

| Sl No. | Reaction time (Hrs) | Adsorbent loading % on substrate | Substrate: Adsorbent | GSM of adsorbent |
|---|---|---|---|---|
| 1 | 6 | 87 | 54:46 | 29 |
| 2 | 8 | 242 | 29:71 | 82 |
| 3 | 10 | 232 | 30:70 | 79 |

B: Using Pre-Treated Substrate

Example 2f: Using Ferric Chloride, without Additive

Three parts of a first solution (Solution-A) are prepared each by dissolving 10.4 gms of 1,3,5-Benzenetricarboxylic acid in aqueous basic medium of 10 gms of sodium hydroxide in 250 ml of water. A substrate comprising of glass fiber and having a basis weight of 33 GSM is pre-treated with 5% silica sol and subjected to natural drying. This pre-treated substrate is also divided into three equal parts. Each pre-treated substrate material after drying is dipped/soaked in a respective part of Solution A at room temperature and then subjected to natural drying. Three parts of a second solution (Solution B) are prepared, each by dissolving 30 gms ferric chloride in 500 ml of water. Each pre-treated substrate which has been treated with Solution A is then separately reacted with a respective part of Solution B at given temperature and time followed by natural drying. Thereafter, the substrates with in situ synthesised MOF are washed with water to remove any by-products formed during the reaction and subjected to natural drying. One substrate part is then treated with 5% silica sol to increase the strength. The substrate parts are thereafter activated. The amount of loading of in situ synthesized MOF on substrate and the effect of variation in time on loading percentage is studied. The results obtained are given in Table 2f below.

TABLE 2f

| Sl No. | Reaction temperature (° C.) | Reaction time (min) | Substrate: adsorbent | Loading % of adsorbent on substrate | GSM of adsorbent |
|---|---|---|---|---|---|
| 1 | 80 | 15 | 59:41 | 70.22 | 27.08 |
| 2 | 90 | 15 | 54:46 | 91.20 | 35.16 |
| 3 | 90 | 30 | 52:48 | 91.30 | 35.22 |

Example 2g: Using Ferrous Chloride without Additive

The procedure set out in Example 2f is followed. Two parts of Solution A is prepared each by dissolving 50.25 gms of 1,3,5-benzenetricarboxylic acid in a solution of 27 gms of sodium hydroxide dissolved in 650 ml of water. Two parts of Solution B is prepared where in each part, instead of ferric chloride, 12 gms of ferrous chloride is dissolved in 480 ml of water. The pre-treated substrate is also divided into two equal parts. The substrate comprises 33 GSM basis weight. The loading percentage of MOF synthesized in situ on substrate and the effect of time variation on loading percentage is studied. The results obtained are given in Table 2g below:

TABLE 2g

| Sl No. | Reaction temperature (° C.) | Reaction time (hrs) | Substrate: adsorbent | Loading % of adsorbent on substrate | GSM of adsorbent |
|---|---|---|---|---|---|
| 1 | RT | 12 | 57:43 | 75.3 | 25.6 |
| 2 | RT | 24 | 61:39 | 63.82 | 21.7 |

Example 3: In Situ Synthesis of CAU-10H

Two parts of Solution A are prepared, each by dissolving 50 gms of Isophthalic acid in 250 ml of dimethyl formamide as solvent. A substrate having basis weight of 33 GSM is pre-treated with 5% silica sol and then dried naturally. This dried substrate is then also divided into two equal parts. Each part is then soaked in a respective part of solution A at room temperature followed by natural drying. Two parts of Solution B are prepared, each by dissolving 100 gms of aluminium sulphate in 500 ml of water. Each part of substrate already dipped in solution A is then separately dipped into respective part of Solution B to initiate a reaction at 70-C at different times, followed by natural drying. The substrate is then washed with water to remove the by-products formed during the reaction, subjected to natural drying and activation in a drying chamber at 140° C. for 2 Hrs. The percentage loading of in situ synthesized MOF on substrate and effect of time variation on loading are studied. The results are in Table 3 below.

TABLE 3

| Sl No. | Reaction temperature (° C.) | Reaction time (min) | Substrate: adsorbent | Loading % of adsorbent on substrate | GSM of adsorbent |
|---|---|---|---|---|---|
| 1 | 70 | 15 | 44:56 | 125.1 | 48.2 |
| 2 | 70 | 30 | 45:55 | 123.24 | 47.52 |

Example 4: In Situ Synthesis of COF-1

Solution A is prepared by dissolving 2 gms of 1,4-benzene diboronic acid in a mixture of ethanol-water in a ratio of 1:3 by volume. 1.5 gms of xanthan gum is added followed by addition of 10 ml of silica sol with continuous stirring. Solution-B is prepared by mixing mesitylene and 1,4-dioxane in a ratio of 1:1 by volume. The reaction time is 2 hours and the reaction temperature is room temperature. The results are given in Table 4 below. The FTIR peaks corresponding to B—O at 138.1%, B—C at 1026.3%, B3O3 at 710.9% transmittance confirms the formation of COF-1 as shown in FIG. 4b compared with available literature.

TABLE 4

| Sl No. | No. of dippings | Adsorbent loading % on substrate | Substrate: Adsorbent | GSM of adsorbent |
|---|---|---|---|---|
| 1 | 1 | 54 | 64:36 | 18 |
| 2 | 2 | 82 | 55:45 | 28 |

Example 5: In Situ Synthesis of ZIF-1

The procedure of Example 4 is followed except that Solution A is prepared by dissolving 6 gms of imidazole in 360 ml of DMF, and Solution B is prepared by dissolving 4.05 gms of zinc nitrate in 405 ml of dimethyl formamide. The reaction time is 30 minutes and reaction temperature is 70-C. The results are in Table 5 below. The representative XRD peaks at 2θ position 23.39 corresponds to the maximum relative intensity as reported in literature for ZIF-1. This is shown in FIG. 4c.

TABLE 5

| Sl No. | Substrate: adsorbent | Loading % of adsorbent on substrate | GSM of adsorbent |
|---|---|---|---|
| 1 | 81:19 | 23.59 | 8.02 |
| 2 | 70:30 | 43.23 | 14.7 |

Example 6: Sequential Dipping in Solution a and Solution B in any Order

Example 6a

The procedure of Example 1g is followed except that the substrate consisting of glass fibers is not subjected to any pre-treatment, and the sequence of dipping comprises first Solution A followed by Solution B. The results are given in Table 6a below:

TABLE 6a

| Sl No. | Solution-A ||||  Reaction temperature (° C.) | Reaction time (min) | Adsorbent loading % on substrate | Substrate:Adsorbent | GSM of adsorbent | % water adsorption at RH-50 |
| --- | --- | --- | --- | --- | --- | --- | --- | --- | --- | --- |
| | KOH (g) | Fumaric acid (g) | Water (mL) | Additive (g) | | | | | | |
| 1 | 120 | 99 | 450 | 2 | 70 | 30 | 104 | 49:51 | 33.6 | 32.3 |
| 2 | 120 | 99 | 450 | 2 | 70 | 30 | 158 | 38:62 | 54 | 30.3 |

Example 6b

The procedure of Example 6a is followed except that the sequence of dipping comprises Solution B followed by Solution A. The results are given in Table 6b below:

TABLE 6b

| Sl No. | Solution-A |||| Reaction temperature (° C.) | Reaction time (min) | Adsorbent loading % on substrate | Substrate:Adsorbent | GSM of adsorbent | % water adsorption at RH-50 |
| --- | --- | --- | --- | --- | --- | --- | --- | --- | --- | --- |
| | KOH (g) | Fumaric acid (g) | Water (mL) | Additive (g) | | | | | | |
| 1 | 100 | 99 | 450 | 2 | 50 | 30 | 136 | 42:58 | 46 | 29.1 |
| 2 | 120 | 99 | 450 | 2 | 70 | 30 | 144 | 41:59 | 49 | 28.6 |

Example 7: Co-Synthesis of Aluminium Fumarate and CAU-10H

Solution A1 is prepared by dissolving isophthalic acid in DMF. Solution A2 is prepared by adding potassium hydroxide to water followed by addition of fumaric acid with continuous stirring. Equal amounts of both the above solutions are mixed together to form a uniform Solution A. The glass fiber substrate is soaked in the above solution at room temperature and then kept for natural drying. Solution B is prepared by dissolving aluminium sulphate in water. The glass fiber substrate, already dipped in Solution A, is then reacted with Solution B at given temperature and time followed by natural drying. The synthesized glass fiber is then washed with water to remove the by-products formed during the reaction. It was then natural dried and activated in a drying chamber at 140° C. for 2 Hrs. The process conditions, concentrations and results are given in Table 7.

TABLE 7

| Sl No. | Solution-A1 || Solution-A2 ||| Solution-A (A1 + A2) (ml) | Reaction temperature (° C.) | Reaction time (min) | Substrate:Adsorbent | Loading % of adsorbent on substrate | GSM of adsorbent |
| --- | --- | --- | --- | --- | --- | --- | --- | --- | --- | --- | --- |
| | Isophthalic acid (g) | DMF (ml) | Fumaric acid (g) | KOH (g) | Water (ml) | | | | | | |
| 1 | 20 | 100 | 24.75 | 30 | 112.5 | 200 | 80 | 15 | 65:35 | 53 | 17.7 |
| 2 | 20 | 100 | 24.75 | 30 | 112.5 | 200 | 80 | 30 | 66:34 | 52.2 | 17.4 |

Example 8: Co-Synthesis of Aluminium Fumarate and Aluminium Silicate

Solution-A is prepared by dissolving potassium hydroxide in water. Fumaric acid is then added to it with continuous stirring. Xanthan gum is added followed by addition of sodium silicate and mixed well. Substrate is soaked in the above solution at room temperature and then kept for natural drying. Solution-B is prepared by dissolving aluminium sulphate in water. The substrate, already dipped in solution-A, is then reacted with solution-B at given temperature and time and then kept for natural drying. The synthesized substrate is washed with water, to remove the by-products formed during the reaction. It is then natural dried and activated in a drying chamber at 140° C. for 2 hours. The details are given in Table 8.

TABLE 8

| | | Solution-A | | | | | | | | |
|---|---|---|---|---|---|---|---|---|---|---|
| Sl No. | KOH (g) | Fumaric acid (g) | Water (mL) | Additive (g) | Sodium Silicate (Sp. Gravity: 1.30 (mL) | Reaction temperature (° C.) | Reaction time (min) | Adsorbent loading % on substrate | Substrate:Adsorbent | GSM of adsorbent |
| 1 | 120 | 99 | 450 | 2 | 150 | 45 | 30 | 220 | 31:69 | 75 |
| 2 | 120 | 99 | 450 | 2 | 450 | 45 | 30 | 183 | 35:65 | 62 |

Example 9: Cross Co-Synthesis: Cross Co-Synthesis of Aluminium Fumarate and MIL-100(Fe)

Solution-A1 is prepared by dissolving 1,3,5-Benzene tricarboxylic acid in aqueous basic solvent, i.e., sodium hydroxide in water with continuous stirring. Xantham gum is also added as an additive. Solution-A2 is prepared by adding potassium hydroxide to water followed by addition of fumaric acid with continuous stirring. Xantham gum is also added as an additive. Both the above solutions are mixed together to form a uniform solution-A. Solution-B1 is prepared by dissolving Ferrous chloride in water. Solution-B2 is prepared by dissolving aluminium sulphate in water. Equal amounts of both the above solutions are mixed together to form a uniform solution-B. The glass fiber substrate is soaked in the solution-A at room temperature and then kept for natural drying. The glass fiber substrate, already dipped in solution-A, is then reacted with solution-B at given temperature and time followed by natural drying. The synthesized glass fiber is then washed with water, to remove the by-products formed during the reaction. It was then natural dried and activated in a drying chamber at 140° C. for 2 Hrs. The results are given in Table 9 below.

TABLE 9

| | Solution-A1 | | | | Solution-A2 | | | |
|---|---|---|---|---|---|---|---|---|
| Sl No. | NaOH (g) | 1,3,5-BTC acid (g) | Water (ml) | Additive (g) | Fumaric acid (g) | KOH (g) | Water (ml) | Additive (g) |
| 1 | 27.4 | 50.28 | 650 | 0 | 24.75 | 30 | 112.5 | 0 |
| 2 | 10 | 10.4 | 250 | 0.75 | 99 | 120 | 450 | 2 |

| Sl No. | Solution-A (A1 + A2) (ml) | Reaction temperature (° C.) | Reaction time (min) | Sub:ads | Loading % of adsorbent on substrate | GSM of adsorbent |
|---|---|---|---|---|---|---|
| 1 | 100 + 100 | 90 | 30 | 81:19 | 23.4 | 7.84 |
| 2 | 50 + 150 | 65 | 60 | 65:35 | 52 | 17.8 |

Example 10: Manufacture of Honeycomb Matrix with In Situ Synthesized Aluminium Fumarate (as Shown in FIG. 8)

Solution A is prepared by dissolving 18.1 kg of potassium hydroxide in 68 L of water, followed by addition of 15 kg of fumaric acid at a temperature in the range of 60° C. with continuous stirring. A viscosity increasing additive, xanthan gum 300 g, is added with continuous agitation. 5 L of polyvinyl alcohol is also added and mixed well. A glass fiber based substrate, to form a honeycomb geometry, is immersed in the Solution A. The substrate is then corrugated to form a rotor, which is then dipped in aluminium sulphate solution having specific gravity of 1.20. The soak time is 30 minutes and soak temperature is 45° C. The rotor is then dried, washed and again dried, followed by activation in a drying chamber. The results are given in Table 10 below.

TABLE 10

| Adsorbent loading % on substrate | Substrate:Adsorbent |
|---|---|
| 139 | 42:58 |

Example 11: Manufacture of a Honeycomb Rotor Through a Continuous Process of Synthesis of Adsorbent Simultaneous and In Situ of the Substrate Passing Through the Continuously Formed Mixture of Component A and B Whereafter it is Formed into a Honeycomb Substrate. (Shown in FIG. 9)

Solution A is prepared by dissolving 6.33 kg of sodium hydroxide in 53.75 L of water, followed by addition of 6.08 kg of fumaric acid at room temperature with continuous stirring. Solution B is prepared by dissolving 12.5 kg of aluminium sulphate in 50 L of water. Both the solutions are mixed together at a temperature of 35° C. A substrate is continuously passed from this solution and converted into a honeycomb shape to form a rotor. The rotor is then dried, washed and again dried, followed by activation in a drying chamber. The results are given in Table 11 below.

TABLE 11

| Adsorbent loading % on substrate | Substrate:Adsorbent | % water adsorption at RH-50 |
|---|---|---|
| 73.5 | 58:42 | 31.4 |

Example 12: Manufacture of a Preformed Honeycomb Matrix Having a MOF Synthesized In Situ (onto and within the Porous Substrate of the Honeycomb) According to One Embodiment of the Invention (FIG. 10)

A honeycomb matrix is prepared using glass fiber substrate and silica sol as rigidifying agent. Solution A is prepared by dissolving 18.1 kg of potassium hydroxide in 68 L of water, followed by addition of 15 kg of fumaric acid at a temperature in the range of 60° C. with continuous stirring. A viscosity increasing additive, xanthan gum 300 g, is added with continuous agitation. 5 L of polyvinyl alcohol is also added and mixed well. Solution-B is aluminium sulphate solution having specific gravity of 1.20. The pre-treated matrix is then dipped in solution-A for 5 minutes at room temperature, which is then natural dried and dipped in solution-B. The soak time is 30 minutes and soak temperature is 45° C. The rotor is then dried, washed and again dried, followed by activation in a drying chamber. Results are in Table 12 below.

TABLE 12

| Adsorbent loading % on substrate | Substrate: Adsorbent | % water adsorption at RH-50 |
| --- | --- | --- |
| 80 | 55:45 | 31.8 |

Example 13: Manufacture of a Honeycomb Matrix Rotor by Impregnating the Substrate in a Slurry of Aluminium Fumarate and Forming into a Honeycomb Rotor (as Shown in FIG. 11)

A slurry of aluminium fumarate is prepared by adding 20 kg of aluminium fumarate to 31.6 L of water with continuous agitation. When complete mixing has taken place, 21 L of acidic sol with specific gravity of 1.12 is added to it. 20 L of polyvinyl alcohol is then added to the solution and mixed well until a homogeneous solution is obtained. A glass fiber substrate is immersed in this slurry followed by corrugation. The rotor that is formed is dried followed by dipping in 5% silica sol. It is then dried and activated. Results are in Table 13 below.

TABLE 13

| Adsorbent loading % on substrate | Substrate: Adsorbent |
| --- | --- |
| 280 | 38:62 |

Example 14: A Pre-Prepared Honeycomb Matrix Rotor Impregnated by Dipping in a Slurry of Aluminium Fumarate (as Shown in FIG. 12)

A slurry containing aluminium fumarate is prepared by adding 20 kg of aluminium fumarate to 31.6 L of water with continuous agitation. When complete mixing has taken place, 21 L of acidic sol with specific gravity of 1.12 is added to it. 20 L of polyvinyl alcohol is then added to the solution and mixed well until a homogeneous solution is obtained. A honeycomb matrix is prepared using glass fiber substrate and silica sol as rigidifying agent. This matrix is then dipped in the slurry. The rotor formed is dried followed by activation in a drying chamber. Results are in Table 14 below.

TABLE 14

| Adsorbent loading % on substrate | Substrate: Adsorbent | % water adsorption at RH-50 |
| --- | --- | --- |
| 82 | 56:44 | 34.2 |

The invention claimed is:

1. A method for the in situ synthesis of MOFs, COFs, or ZIFs, onto and within a porous substrate comprising: contacting the porous substrate with a first solution and a second solution, wherein the first and the second solutions are capable of forming the said MOFs, COFs, or ZIFs, and wherein the ratio of in situ synthesized adsorbent to bare substrate is in the range of 0.1 to 6 times by weight of the in situ synthesized adsorbent to the bare substrate.

2. The method as claimed in claim 1, wherein the porous substrate is contacted with the first solution and the second solution, sequentially in any order or simultaneously as a mixture of the two solutions.

3. The method as claimed in claim 1, wherein the first solution and/or the second solution comprise a mixture of two or more solutions, wherein the resulting adsorbent synthesized in situ is either one or more MOFs, COFs, or ZIFs or a combination of one or more of MOFs, COFs or ZIFs with an inorganic adsorbent.

4. The method as claimed in claim 1, wherein the contacting is done by dipping or soaking.

5. The method as claimed in claim 4, wherein dipping/soaking time, temperature, pressure, concentration, and viscosity for both the first solution and the second solution are optimized with or without use of enhancers or retarders.

6. The method as claimed in claim 1, wherein the substrate is pretreated with a rigidifying agent selected from the group consisting of silica sol, alumina sol, polyvinyl alcohol, polyvinyl acetate, acrylate, water glass and any combination thereof.

7. The method as claimed in claim 1, wherein the substrate is washed after in situ synthesis to remove unreacted or excess starting material or byproducts formed during the synthesis, drying, and activation.

8. The method as claimed in claim 4, wherein the substrate is converted into a desired geometry after dipping in a first solution, followed by dipping/soaking the shaped substrate into a second solution to result in the in situ formation of the adsorbent.

9. The method as claimed in any of claim 4, wherein the substrate is first shaped into a desired geometry, followed by sequential dipping of the shaped substrate into a first solution and a second solution or a mixture of the first and second solutions to result in the in situ formation of an adsorbent.

10. The method as claimed in claim 1, wherein a dosing amount of titanium silicate is added to the first solution or the second solution prior to treatment of the substrate.

11. The method as claimed in claim 1, wherein the substrate is subjected to burn-off of substantially all organic binding material without affecting the adsorbent properties.

12. The method as claimed in claim 1, wherein the in situ synthesized MOF comprises any one of MIL-100 (Fe), AlF, MOF-5, Cu-BTC, MIL-53, MIL-68, Mg-MOF-74, MIL-101 (Cr), MOF 801, MOF 177, CAU-10H, MOF 808, IR-MOF-8, CPO-Ni (27), MOF 199, DMOF (Zn), DUT-4, and a combination thereof.

13. The method as claimed in claim 1, wherein the COF formed in situ is selected from the group consisting of COF-202, COF-1, COF-5, PcPBBA, TpPa-1, TpPa-2, TpPa-NO2, TpPa-F4, TpBD, TpBD-(NO2), and a combination thereof.

14. A method as claimed in claim 1, wherein the ZIF is selected from the group consisting of ZIF-1, ZIF-7, ZIF-8, ZIF-35, ZIF-67, ZIF-69, ZIF-71, ZIF-90, ZIF-95 and ZIF-100, and a combination thereof.

15. The method as claimed in claim 1, wherein the substrate is a porous substrate selected from the group consisting of glass fibers, ceramic fibres, natural fibers, synthetic fibers, biosoluble fibers, pulp and any combination thereof, and if desired strengthened with 2 to 8% by weight of a rigidifying agent selected from the group consisting of silica sol, alumina sol, polyvinyl alcohol, polyvinyl acetate, and acrylate.

16. The method as claimed in claim 1, wherein the loaded substrate is dried at a temperature of up to 90° C.

17. The method as claimed in claim 1, wherein the substrate treated with both solutions is dried at a temperature in the range of 80° C. to 160° C.

18. The method as claimed in claim 1, further comprises 0.25 to 15% by weight of an additive selected from the group consisting of xanthan gum, sodium alginate, hydroxypropylmethylcellulose, guar gum, starch, and ethylene glycol, been added to the substrate via the solution containing the organic component.

19. The method as claimed in claim 1, further comprises an organic linker used to impregnate the substrate that is a bidentate or tridentate ligand derived from a dicarboxylic acid selected from the group consisting of oxalic acid, tartaric acid, succinic acid, 1,4-butanedicarboxylic acid, 1,4-butene-dicarboxylic acid, 4-oxopyran-2,6-dicarboxylic acid, decanedicarboxylic acid, 1,8-heptadecanedicarboxylic acid, 1,6-hexanedicarboxylic acid, heptadecanedicarboxylic acid, acetylene dicarboxylic acid, 1,9-heptadecanedicarboxylic acid, 1,2-benzenedicarboxylic acid, 1,3-benzenedicarboxylic acid, 2,3-pyridinedicarboxylic acid, pyridine-2,3-dicarboxylic acid, 1,4-benzenedicarboxylic acid, p-benzenedicarboxylic acid, imidazole-2,4-dicarboxylic acid, 2-methylquinoline-3,4-dicarboxylic acid, quinoline-2,4-dicarboxylic acid, quinoxaline-2,3-dicarboxylic acid, 6-chloroquinoxaline-2,3-dicarboxylic acid, 1,3-butadiene-1,4-dicarboxylic acid, 4,4'-diaminophenylmethane-3,3'-dicarboxylic acid, quinoline-3,4-dicarboxylic acid, di imidedicarboxylic acid, pyridine-2,6-dicarboxylic acid, 2-methylimidazole-4,5-dicarboxylic acid, 7-chloro-4-hydroxyquinoline-2,8-dicarboxylic acid, thiophene-3,4-dicarboxylic acid, tetrahydropyran-4,4-dicarboxylic acid, perylene-3,9-dicarboxylic acid, 2-isopropylimidazole-4,5-dicarboxylic acid, perylenedicarboxylic acid, Pluriol E 200-dicarboxylic acid, 3,5-cyclohexadiene-1,2-dicarboxylic acid, octanedicarboxylic acid, pentane-3,3-carboxylic acid, 3,6-dioxaoctanedicarboxylic acid, 4,4'-diamino-1,1'-biphenyl-3,3'-dicarboxylic acid, 4,4'-diaminobiphenyl-3,3'-dicarboxylic acid, benzidine-3,3'-dicarboxylic acid, 1,1'-binaphthyldicarboxylic acid, 1,4-bis(phenylamino)benzene-2,5-dicarboxylic acid, 7-chloro-8-methylquinoline-2,3-dicarboxylic acid, 1-anilinoanthraquinone-2,4'-dicarboxylic acid, 1,4-bis(carboxymethyl) piperazine-2,3-dicarboxylic acid, phenylinanedicarboxylic acid, 7-choroquinoline-3,8-dicarboxylic acid, polytetrahydrofuran 250-dicarboxylic acid, 1-(4-carboxy)phenyl-3-(4-chloro)phenylpyrazoline-4,5-dicarboxylic acid, 1,4,5,6,7,7-hexachloro-5-norbornene-2,3-dicarboxylic acid, 1,3-dibenzyl-2-oxoimidazolidine-4,5-dicarboxylic acid, 1,4-cyclohexanedicarboxylic acid, naphthalene-1,8-dicarboxylic acid, 1,3-dibenzyl-2-oxoimidazolidine-4,5-cis-dicarboxylic acid, 2,2'-biquinoline-4,4'-dicarboxylic acid, 2-benzoylbenzene-1,3-dicarboxylic acid, pyridine-3,4dicarboxylic acid, 3,6,9-trioxaundecanedicarboxylic acid, Pluriol E 300 dicarboxylic acid, Pluriol E 400-dicarboxylic acid, hydroxybenzophenonedicarboxylic acid, Pluriol E 600-dicarboxylic acid, pyrazole-3,4-dicarboxylic acid, bis(4-aminophenyl) sulfone diimide-dicarboxylic acid, 5,6-dimethyl-2,3-pyrazinedicarboxylic acid, bis(4-aminophenyl) ether diimide-dicarboxylic acid, 2,3-pyrazinedicarboxylic acid, 4,4'-diaminodiphenylmethane diimide-dicarboxylic acid, 1,4-naphthalenedicarboxylic acid, 1,3-adamantanedicarboxylic acid, 1,8-naphthalenedicarboxylic acid, 2,6-naphthalenedicarboxylic acid, 2,3-naphthalenedicarboxylic acid, 8-methoxy-2,3-naphthalenedicarboxylic acid, 8-sulfo-2,3-naphthalenedicarboxylic acid, anthracene-2,3-dicarboxylic acid, 8-nitro-2,3-naphthalenecarboxylic acid, 2',3'-diphenyl-p-terphenyl-4,4"-dicarboxylic acid, (diphenyl ether)-4,4'-dicarboxylic acid, 4(1H)-oxothiochromene-2,8-dicarboxylic acid, imidazole-4,5-dicarboxylic acid, 5-tert-butyl-1,3-benzenedicarboxylic acid, 7,8-quinolinedicarboxylic acid, 4,5-imidazoledicarboxylic acid, 1,3,5-benzenetricarboxylic acid, 1,3,5-tris(4-carboxyphenyl)benzene, and comprises heterocyclic aromatic organic compounds for in situ synthesis of ZIFs selected from the group consisting of imidazole, benzimidazole, chlorobenzimidazole, nitroimidazole, 2-methylimidazole, and imidazole-2-carboxyaldehyde.

20. The method as claimed in claim 1, further comprises metal salt selected from the group consisting of ferric nitrate, ferric chloride, ferrous chloride, chromium nitrate, chromium chloride, aluminium sulphate, aluminium chloride, aluminium bromide, aluminium hydrogensulfate, aluminium dihydrogen phosphate, aluminium monohydrogen phosphate, aluminium phosphate, aluminium nitrate, nickel acetate, zirconium oxychloride, zinc nitrate, zinc acetate, copper acetate, copper nitrate, cobalt nitrate and magnesium nitrate.

21. The method as claimed in claim 20, wherein the concentration of the metal salt in solution is in the range of 5% to 50% by weight of the solution.

22. The method as claimed in claim 1, further comprises solvent selected from the group consisting of water, methanol, ethanol, n-propanol, iso-propanol, n-butanol, isobutanol, t-butanol, pentanol, hexanol, dimethyl sulfoxide, N,N-dimethyl formamide, N,N-diethyl formamide, toluene, acetonitrile, dioxane, N,N-dimethylacetamide, benzene, chlorobenzene, tetrahydrofuran, ethyl acetate, methyl ethyl ketone, pyridine, sulfolane, glycol, N-methylpyrrolidone, diethyl amine, triethyl amine, gamma-butyrolactone, cyclohexanol, acetylacetonate, mesitylene and other similar aqueous, non-aqueous, aliphatic, aromatic, organic, in-organic solvents and mixture thereof.

23. The method as claimed in claim 1, wherein the reaction temperature is in the range of 5 to 120° C., and a reaction time is in the range of 10 min to 24 hours.

24. A porous substrate having MOFs, COFs, or ZIFs synthesized in situ onto and within the substrate by a method as claimed in claim 1, for use in gas separation membranes, dehumidification applications, drug delivery systems, energy storage devices, CO2 capture, sensors, lithium batteries.

25. An adsorbent matrix comprising one or more adsorbents selected from the group consisting of MOFs, COFs, ZIFs, and a combination thereof, with and optionally an inorganic adsorbent, synthesized by a method as claimed in claim 1, wherein the ratio of the in situ synthesized adsorbent to substrate is in the range of 0.1 to 6 times by weight of the adsorbent to the bare substrate.

26. The adsorbent matrix as claimed in claim 25 wherein the matrix is in the form of a honeycomb.

27. The adsorbent matrix as claimed in claim 25 wherein the MOF comprises any one of MIL-100 (Fe), AIF, MOF-5, Cu-BTC, MIL-53, MIL-68, Mg-MOF-74, MIL-101 (Cr), MOF 801, MOF 177, CAU-10H, MOF 808, IR-MOF-8, CPO-Ni (27), MOF 199, DMOF (Zn), DUT-4, and a combination thereof.

28. The adsorbent matrix as claimed in claim 25 wherein the COF is selected from the group consisting of COF-202, COF-1, COF-5, PcPBBA, TpPa-1, TpPa-2, TpPa-NO2, TpPa-F4, TpBD, TpBD-(NO2), and a combination thereof.

29. The adsorbent matrix as claimed in claim 25 wherein ZIF is selected from the group consisting of ZIF-1, ZIF-7, ZIF-8, ZIF-35, ZIF-67, ZIF-69, ZIF-71, ZIF-90, ZIF-95 and ZIF-100, and a combination thereof.

30. The adsorbent matrix as claimed in claim 25 wherein the substrate is a porous substrate selected from the group consisting of glass fibers, ceramic fibres, natural fibers, synthetic fibers, biosoluble fibers, pulp and combination thereof, and optionally strengthened with 2 to 8% by weight of a rigidifying agent selected from the group consisting of silica sol, alumina sol, polyvinyl alcohol, polyvinyl acetate, and acrylate.

31. A method for the manufacture of an adsorbent matrix as claimed in claim 26, wherein one or more adsorbents selected from the group consisting of MOFs, COFs, ZIFs, and a combination of one or more MOFs, COFs, ZIFs, and optionally an inorganic adsorbent are synthesized onto and within a substrate thereon; wherein the ratio of the in situ synthesized adsorbent to bare substrate is in the range of 0.1 to 6 times by weight of the adsorbent to the bare substrate.

32. The method as claimed in claim 31, wherein the in situ synthesis or impregnation is followed by washing to remove unreacted or excess starting material or byproducts formed during the synthesis, and, drying and/or activation.

33. The method as claimed in claim 31, comprising dipping the substrate in a first solution, converting the dipped substrate into a shaped matrix, followed by dipping the shaped matrix into a second solution.

34. The method as claimed in claim 33, wherein the first solution or the second solution is a combination of two or more solutions.

35. The method as claimed in claim 33, wherein the contacting with the first and second solutions can be sequential in any order or simultaneous with a mixture of the first and second solutions.

36. The method as claimed in claim 31, wherein the adsorbent substrate is treated with a rigidifying agent.

37. The method as claimed in claim 31, wherein the adsorbent is present in the form of a slurry and wherein the impregnation is carried out using a suitable binder selected from the group consisting of inorganic or organic binders.

38. The method as claimed in claim 37, wherein the dipping/soaking time and concentration/viscosity for the adsorbent slurry at synthesis are adjusted.

39. A method for filtering an adsorbate from a fluid using an adsorbent laden matrix as claimed in claim 26.

40. The method as claimed in claim 39, wherein the fluid can be liquid or a gas, or a combination of liquids or a combination of gases.

41. The method as claimed in claim 39, wherein the adsorbate can be a liquid or gas or a combination of liquids or a combination of gases.

42. The method as claimed in claim 39, wherein the adsorbate is water vapour, CO2, VOCs and other gaseous matter and the adsorbent laden matrix is provided in a desiccant/adsorbent shaped wheel or a shaped matrix of any geometry.

43. A desiccant wheel having an adsorbent matrix as claimed in claim 25.

* * * * *